(12) United States Patent
Huang et al.

(10) Patent No.: US 12,199,752 B2
(45) Date of Patent: Jan. 14, 2025

(54) SIDELINK CHANNEL STATE INFORMATION TRANSMISSION METHOD AND COMMUNICATION APPARATUS

(71) Applicant: Huawei Technologies Co., Ltd., Shenzhen (CN)

(72) Inventors: Haining Huang, Beijing (CN); Chao Li, Beijing (CN); Xingwei Zhang, Lund (SE); Junwei Wang, Shenzhen (CN); Zhe Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 367 days.

(21) Appl. No.: 17/672,545

(22) Filed: Feb. 15, 2022

(65) Prior Publication Data

US 2022/0173829 A1    Jun. 2, 2022

Related U.S. Application Data

(63) Continuation of application No. PCT/CN2020/109386, filed on Aug. 14, 2020.

(30) Foreign Application Priority Data

Aug. 16, 2019    (CN) .......................... 201910760933.3

(51) Int. Cl.
*H04L 1/00*    (2006.01)
*H04W 4/40*    (2018.01)
(Continued)

(52) U.S. Cl.
CPC ........... *H04L 1/0004* (2013.01); *H04W 72/02* (2013.01); *H04W 72/0446* (2013.01);
(Continued)

(58) Field of Classification Search
CPC .. H04L 1/0004; H04W 72/20; H04W 72/542; H04W 72/02; H04W 72/0446;
(Continued)

(56) References Cited

U.S. PATENT DOCUMENTS

2017/0238260 A1    8/2017   Kim et al.
2018/0368108 A1*  12/2018   Zeng ................. H04L 1/0009
(Continued)

FOREIGN PATENT DOCUMENTS

| CN | 103856300 A | 6/2014 |
|---|---|---|
| CN | 104301067 A | 1/2015 |

(Continued)

OTHER PUBLICATIONS

WO_2019096658_A1_I (Year: 2019).*
(Continued)

*Primary Examiner* — Rushil P. Sampat

(57) ABSTRACT

This application provides a sidelink channel state information transmission method and a communication apparatus. The method and the apparatus may be applied to systems such as an internet of vehicles, V2X, and V2V. The method includes: a first terminal device sends modulation and coding scheme (MCS) table indication information, wherein the MCS table indication information indicates a MCS table corresponding to data sent by the first terminal device to a second terminal device, and the MCS table is associated with a resource pool for sending the data.

24 Claims, 11 Drawing Sheets

(51) Int. Cl.
*H04W 72/02* (2009.01)
*H04W 72/0446* (2023.01)
*H04W 72/20* (2023.01)
*H04W 72/542* (2023.01)

(52) U.S. Cl.
CPC ......... *H04W 72/20* (2023.01); *H04W 72/542* (2023.01); *H04W 4/40* (2018.02)

(58) Field of Classification Search
CPC ... H04W 4/40; H04W 72/0406; H04W 28/26; H04W 4/70; H04W 72/1263; H04W 72/541; H04W 76/14; H04W 92/18
See application file for complete search history.

(56) References Cited

U.S. PATENT DOCUMENTS

| | | | |
|---|---|---|---|
| 2020/0267043 A1* | 8/2020 | Chen | H04L 27/36 |
| 2021/0136744 A1* | 5/2021 | Lu | H04W 72/20 |
| 2021/0175999 A1* | 6/2021 | Kittichokechai | H04L 1/0016 |

FOREIGN PATENT DOCUMENTS

| | | | |
|---|---|---|---|
| CN | 107534828 A | | 1/2018 |
| CN | 107534982 A | | 1/2018 |
| CN | 107925493 A | | 4/2018 |
| CN | 109660315 A | | 4/2019 |
| EP | 3340671 A1 | | 6/2018 |
| EP | 3499766 A1 | | 6/2019 |
| WO | 2018135905 A1 | | 7/2018 |
| WO | 2019099319 A1 | | 5/2019 |

OTHER PUBLICATIONS

WO_2019161622_A1_I (Year: 2019).*
WO_2020015345_A1_I (Year: 2020).*
Ren, Y. et al., Power Control in D2D-Based Vehicular Communication Networks, IEEE Transactions on Vehicular Technology, vol. 64, No. 12, Dec. 2015, 16 pages.
LG Electronics, "Discussion on aperiodic CSI report timing and relaxation", 3GPP TSG RAN WG1 Meeting #92, R1-1802192, Feb. 26-Mar. 2, 2018, 6 pages, Athens, Greece.
Guo, B. et al., "Discussions on NB-IoT Wireless Throughput and Low Power Consumption Technology", Mobile Communications, Mar. 16, 2017, with an English Abstract, 6 pages.
Samsung, "Feature lead summary#2 for 7.2.4.1 Physical layer structure for sidelink", 3GPP TSG RAN WG1 #97 Meeting, R1-1907755, May 13-17, 2019, 26 pages, Reno, USA.
3GPP TS 38.211 V15.6.0 (Jun. 2019) 3rd Generation Partnership Project; Technical Specification Group Radio Access Network; NR; Physical channels and modulation(Release 15), 97 pages.
Samsung, "CSI reporting and SRS timing upon SCell activation/deactivation", 3GPP TSG-RAN1#63bis meeting, R1-110069, Jan. 17-21, 2011, 8 pages, Dublin, Ireland.
CMCC, "Discussion on CSI report enhancement for CDRX", 3GPP TSG RAN WG1 Meeting #95, R1-1812891, Nov. 12-16, 2018, 5 pages, Spokane, USA.
LG Electronics et al., "New WID on 5G V2X with NR sidelink", 3GPP TSG RAN Meeting #83, RP-190766, Mar. 18-21, 2019, 8 pages, Shenzhen, China.
3GPP TS 38.212 V15.6.0 (Jun. 2019), 3rd Generation Partnership Project; Technical Specification Group Radio Access Network; NR; Multiplexing and channel coding(Release 15), 101 pages.
Ericsson, "On SCI formats", 3GPP TSG-RAN WG1 Meeting #94bis, R1-1813649, Oct. 8-12, 2018, 2 pages, Chengdu, China.
3GPP TS 38.214 V15.6.0 (Jun. 2019), 3rd Generation Partnership Project; Technical Specification Group Radio Access Network; NR; Physical layer procedures for data(Release 15), 105 pages.
Qualcomm Incorporated, "Considerations on Physical Layer aspects of NR V2X", 3GPP TSG RAN WG1 Meeting #97, R1-1907269, May 13-17, 2019, 15 pages, Reno, USA.
R2-1801904, Huawei et al., Coexistence of R14 UEs and R15 UEs regarding 64QAM and Tx diversity, 3GPP TSG-RAN WG2 Meeting #101, Athens, Greece, Feb. 26-Mar. 2, 2018, 4 pages.
InterDigital Inc., Indication of Transmission Format for R15 Features, 3GPP RAN WG1 Meeting #93, R1-1806961, Busan, Korea, May 21-25, 2018,3 pages.
LG Electronics, Discussions on CQI and MCS tables, 3GPP TSG RAN WG1 Meeting #90, R1-1713152, Prague, Czech Republic, Aug. 21-25, 2017, 4 pages.

* cited by examiner

SIDELINK CHANNEL STATE INFORMATION TRANSMISSION METHOD AND COMMUNICATION APPARATUS

CROSS-REFERENCE TO RELATED APPLICATIONS

This application is a continuation of International Application No. PCT/CN2020/109386, field on Aug. 14, 2020, which claims priority to Chinese Patent Application No. 201910760933.3, filed on Aug. 16, 2019. The disclosures of the aforementioned applications are hereby incorporated by reference in their entireties.

TECHNICAL FIELD

This application relates to the communication field, and more specifically, to a sidelink channel state information transmission method and a communication apparatus.

BACKGROUND

Vehicle-to-everything (vehicle to everything, V2X) communication is an important key technology for implementing environment perception and information exchange in an internet of vehicles. Everything herein may be another vehicle, another infrastructure, a pedestrian, a terminal device, or the like. In V2X, a sidelink (side link, SL) is a communication link between a terminal device (for example, a vehicle) and a terminal device (for example, another device). In a V2X communication system, a sending device sends a reference signal to a receiving device. After receiving the reference signal, the receiving device determines channel state information (CSI) between the sending device and the receiving device, and then sends the CSI to the sending device by using a physical sidelink shared channel (PSSCH). However, the receiving device does not always have data that is to be sent to the sending device. When the receiving device has no data that is to be sent to the sending device, a waste of resources may be caused when the receiving device sends only the CSI by using the physical sidelink shared channel (PSSCH). In addition, because the CSI has timeliness, the receiving device cannot determine when to send only the CSI by using the PSSCH. Consequently, reliability of sidelink CSI transmission cannot be ensured.

SUMMARY

This application provides a sidelink channel state information transmission method and a communication apparatus. In this way, reliability of sidelink CSI transmission may be ensured. Further, resource consumption caused by CSI transmission may be reduced, and resource utilization may be improved.

According to a first aspect, a sidelink channel state information transmission method is provided. The method may be performed by a first terminal device, or may be performed by a chip used in the first terminal device. That the method is performed by the first terminal device is used as an example for description.

The method includes: The first terminal device sends indication information to a second terminal device, where the indication information indicates a time window, a first time interval in the time window is used by the first terminal device to receive channel state information CSI and first data that are of a sidelink from the second terminal device, a second time interval in the time window is used by the first terminal device to receive the CSI from the second terminal device, and the first time interval is earlier than the second time interval in time domain; the first terminal device sends a reference signal RS to the second terminal device, where the RS is used to determine the CSI; and the first terminal device receives, in the first time interval, the CSI and the first data from the second terminal device, or receives, in the second time interval, the CSI from the second terminal device. The first data is data sent by the second terminal device to the first terminal device.

According to the sidelink channel state information transmission method provided in the first aspect, the time window for CSI feedback is configured, and the time window includes the first time interval used to feed back both the data and the CSI and the second time interval used to feed back only the CSI. Even if there is no data transmission, normal transmission of the CSI is ensured, and therefore the CSI feedback is ensured. In addition, it is specified that sending only the CSI is performed exclusively in the second time interval, so that resource consumption caused by sending only the CSI is reduced, and resource utilization is improved.

In a possible implementation of the first aspect, the indication information further indicates a time domain position of the first time interval in the time window and/or a time domain position of the second time interval in the time window. In this implementation, efficiency and accuracy of determining the time domain position of the first time interval in the time window and/or the time domain position of the second time interval in the time window by the second terminal device may be improved.

In a possible implementation of the first aspect, the time domain position of the first time interval in the time window and/or the time domain position of the second time interval in the time window are/is predefined. In this implementation, the first terminal device does not need to indicate, to the second terminal device, the time domain position of the first time interval in the time window and/or the time domain position of the second time interval in the time window, so that signaling overheads may be reduced.

In a possible implementation of the first aspect, the first data is broadcast data or multicast data, and that the first terminal device receives, in the first time interval, the CSI and the first data from the second terminal device includes: The first terminal device receives, in the first time interval, the CSI, an identifier of the first terminal device, and the broadcast data or the multicast data from the second terminal device. In this implementation, when the first data is the broadcast data, correct transmission of the broadcast data and the CSI is ensured.

In a possible implementation of the first aspect, the CSI includes a channel quality indicator CQI value corresponding to the sidelink, or the CSI includes a CQI table corresponding to the sidelink and a CQI value in the CQI table. In this implementation, the CSI may be more efficient, and accuracy and reliability of the CSI may be improved. This helps the first terminal device select a proper MCS parameter based on the CSI, to send data to the second terminal device.

In a possible implementation of the first aspect, the method further includes: The first terminal device sends, to the second terminal device, CQI table indication information corresponding to the sidelink, where the CQI table indication information indicates the CQI table corresponding to the sidelink, and the CQI table indication information includes a priority and/or a quality of service corresponding to data sent by the first terminal device to the second terminal device. This implementation helps the second terminal device accurately and quickly determine the CQI table, and further determine the CQI value in the CQI table. In this way, the accuracy and the reliability of the CSI are improved.

In a possible implementation of the first aspect, that the first terminal device sends the CQI table indication information to the second terminal device includes: The first terminal device sends first sidelink control information SCI to the second terminal device, where the first SCI is used to schedule the data sent by the first terminal device to the second terminal device on the sidelink, the first SCI includes a priority field and/or a quality of service indication field, and the priority field and/or the quality of service indication field are/indicates the CQI table. In this implementation, the CQI table is indicated by using the priority field and/or the quality of service indication field included in the first SCI, so that signaling overheads for indicating the CQI table may be reduced.

In a possible implementation of the first aspect, the method further includes: The first terminal device sends the first sidelink control information SCI to the second terminal device, where the first SCI includes an indication field, the indication field indicates a modulation and coding scheme MCS table corresponding to the data sent by the first terminal device to the second terminal device on the sidelink, and the first SCI is used to schedule the data sent by the first terminal device to the second terminal device on the sidelink. In this implementation, the first terminal device indicates the MCS table to the second terminal device, so that the second terminal device determines, based on the MCS table, an MCS parameter used to receive the data of the first terminal device, thereby improving reliability of determining the MCS table by the second terminal device. This helps the second terminal device accurately receive the data.

In a possible implementation of the first aspect, the indication field in the first SCI is the priority field and/or the quality of service indication field in the first SCI, and the priority field or the quality of service indication field indicates the priority and/or the quality of service corresponding to the data. In this implementation, the MCS table is indicated by using the priority field and/or the quality of service indication field included in the first SCI, so that signaling overheads for indicating the MCS table may be reduced.

In a possible implementation of the first aspect, the CSI is carried in second SCI that is received by the first terminal device from the second terminal device. In this implementation, the SCI sent by the second terminal device is received, where the SCI carries the CSI, so that reliability of CSI transmission may be ensured, and resource overheads of the CSI transmission may be reduced.

According to a second aspect, a sidelink channel state information transmission method is provided. The method may be performed by a second terminal device, or may be performed by a chip used in the second terminal device. That the method is performed by the second terminal device is used as an example for description.

The method includes: The second terminal device receives indication information from a first terminal device, where the indication information indicates a time window; the second terminal device determines a first time interval and a second time interval in the time window, where the first time interval is used by the second terminal device to send channel state information CSI and first data that are of a sidelink to the first terminal device, the second time interval is used by the second terminal device to send the CSI to the first terminal device, and the first time interval is earlier than the second time interval in time domain; the second terminal device receives a reference signal RS from the first terminal device; the second terminal device determines the CSI based on the RS; and the second terminal device sends, in the first time interval, the CSI and the first data to the first terminal device, or sends, in the second time interval, the CSI to the first terminal device. The first data is data sent by the second terminal device to the first terminal device.

According to the sidelink channel state information transmission method provided in the second aspect, the time window for CSI feedback is configured, and the time window includes the first time interval used to feed back both the data and the CSI and the second time interval used to feed back only the CSI. Even if there is no data transmission, normal transmission of the CSI is ensured, and therefore the CSI feedback is ensured. In addition, it is specified that sending only the CSI is performed exclusively in the second time interval, so that resource consumption caused by sending only the CSI is reduced, and resource utilization is improved.

In a possible implementation of the second aspect, the indication information further indicates a time domain position of the first time interval in the time window and/or a time domain position of the second time interval in the time window. In this implementation, efficiency and accuracy of determining the time domain position of the first time interval in the time window and/or the time domain position of the second time interval in the time window by the second terminal device may be improved.

In a possible implementation of the second aspect, the time domain position of the first time interval in the time window and/or the time domain position of the second time interval in the time window are/is predefined. In this implementation, the time domain position of the first time interval in the time window and/or the time domain position of the second time interval in the time window does not need to be indicated to the second terminal device, so that signaling overheads may be reduced.

In a possible implementation of the second aspect, the first data is broadcast data or multicast data, and that the second terminal device sends, in the first time interval, the CSI and the first data to the first terminal device includes: The second terminal device sends, in the first time interval, the CSI, an identifier of the first terminal device, and the broadcast data or the multicast data to the first terminal device. In this implementation, when the first data is the broadcast data, correct transmission of the broadcast data and the CSI is ensured.

In a possible implementation of the second aspect, the CSI includes a channel quality indicator CQI value corresponding to the sidelink, or the CSI includes a CQI table corresponding to the sidelink and a CQI value in the CQI table. In this implementation, the CSI may be more efficient, and accuracy and reliability of the CSI may be improved.

In a possible implementation of the second aspect, the method further includes: The second terminal device receives, from the first terminal device, CQI table indication information corresponding to the sidelink, where the CQI table indication information indicates the CQI table corresponding to the sidelink, and the CQI table indication information includes a priority and/or a quality of service corresponding to data received by the second terminal device from the first terminal device on the sidelink; and the second terminal device determines, based on the CQI table indication information, the CQI table corresponding to the sidelink. This implementation helps the second terminal device accurately and quickly determine the CQI table, and further determine the CQI value in the CQI table. In this way, the accuracy and the reliability of the CSI are improved.

In a possible implementation of the second aspect, that the second terminal device receives the CQI table indication information from the first terminal device includes: The second terminal device receives first sidelink control information SCI from the first terminal device, where the first SCI is used to schedule the data received by the second terminal device from the first terminal device on the sidelink, the first SCI includes a priority field and/or a quality of service indication field, and the priority field or the quality of service indication field indicates the priority and/or the quality of service corresponding to the data. In this implementation, the CQI table is indicated by using the priority field and/or the quality of service indication field included in the first SCI, so that signaling overheads for indicating the CQI table may be reduced.

In a possible implementation of the second aspect, the method further includes: The second terminal device receives the first sidelink control information SCI from the first terminal device, where the first SCI includes an indication field, the indication field in the first SCI indicates a modulation and coding scheme MCS table corresponding to the data received by the second terminal device from the first terminal device on the sidelink, and the first SCI is used to schedule the data received by the second terminal device from the first terminal device on the sidelink. This implementation helps the second terminal device determine, based on the MCS table, an MCS parameter used to receive the data of the first terminal device, thereby improving reliability of determining the MCS table by the second terminal device. This helps the second terminal device accurately receive the data.

In a possible implementation of the second aspect, the indication field in the first SCI is the priority field and/or the quality of service indication field in the first SCI, and the priority field or the quality of service indication field indicates the priority and/or the quality of service corresponding to the data. In this implementation, the MCS table is indicated by using the priority field and/or the quality of service indication field included in the first SCI, so that signaling overheads for indicating the MCS table may be reduced.

In a possible implementation of the second aspect, the CSI is carried in second SCI that is sent by the second terminal device to the first terminal device. In this implementation, the second terminal device sends the CSI to the first terminal device by including the CSI in the SCI, so that reliability of CSI transmission may be ensured, and resource overheads of the CSI transmission may be reduced.

According to a third aspect, a sidelink channel state information transmission method is provided. The method may be performed by a first terminal device, or may be performed by a chip used in the first terminal device. That the method is performed by the first terminal device is used as an example for description.

The method includes: The first terminal device sends indication information to a second terminal device, where the indication information indicates a first time unit and a second time unit, the first time unit is used by the first terminal device to receive channel state information CSI and first data that are of a sidelink from the second terminal device, the second time unit is used by the first terminal device to receive the CSI from the second terminal device, and the first time unit is earlier than the second time unit in time domain; the first terminal device sends a reference signal RS to the second terminal device, where the RS is used to determine the CSI; and the first terminal device receives, in the first time unit, the CSI and the first data from the second terminal device, or receives, in the second time unit, the CSI from the second terminal device. The first data is data sent by the second terminal device to the first terminal device.

According to the sidelink channel state information transmission method provided in the third aspect, the first time unit and the second time unit are configured, where both the CSI and the data are transmitted in the first time unit, and only the CSI is transmitted in the second time unit. Even if there is no data transmission, normal transmission of the CSI is ensured, and therefore CSI feedback is ensured. In addition, it is specified that transmitting only the CSI by using a PSSCH is performed exclusively in the second time unit, so that resource consumption caused by transmitting only the CSI by using the PSSCH is reduced, and resource utilization is improved.

In a possible implementation of the third aspect, the first data is broadcast data or multicast data, and that the first terminal device receives, in the first time unit, the CSI and the first data from the second terminal device includes: The first terminal device receives, in the first time unit, the CSI, an identifier of the first terminal device, and the broadcast data or the multicast data from the second terminal device.

In a possible implementation of the third aspect, the CSI includes a channel quality indicator CQI value corresponding to the sidelink, or the CSI includes a CQI table corresponding to the sidelink and a CQI value in the CQI table.

In a possible implementation of the third aspect, the method further includes: The first terminal device sends, to the second terminal device, CQI table indication information corresponding to the sidelink, where the CQI table indication information indicates the CQI table corresponding to the sidelink, and the CQI table indication information includes a priority and/or a quality of service corresponding to data sent by the first terminal device to the second terminal device.

In a possible implementation of the third aspect, that the first terminal device sends the CQI table indication information to the second terminal device includes:

The first terminal device sends first sidelink control information SCI to the second terminal device, where the first SCI is used to schedule the data sent by the first terminal device to the second terminal device on the sidelink, the first SCI includes a priority field and/or a quality of service indication field, and the priority field and/or the quality of service indication field are/indicates the CQI table.

In a possible implementation of the third aspect, the method further includes: The first terminal device sends the first sidelink control information SCI to the second terminal device, where the first SCI includes an indication field, the indication field indicates a modulation and coding scheme MCS table corresponding to the data sent by the first terminal device to the second terminal device on the sidelink, and the first SCI is used to schedule the data sent by the first terminal device to the second terminal device on the sidelink.

In a possible implementation of the third aspect, the indication field in the first SCI is the priority field and/or the quality of service indication field in the first SCI, and the priority field or the quality of service indication field indicates the priority and/or the quality of service corresponding to the data.

In a possible implementation of the third aspect, the CSI is carried in second SCI that is received by the first terminal device from the second terminal device.

According to a fourth aspect, a sidelink channel state information transmission method is provided. The method may be performed by a second terminal device, or may be performed by a chip used in the second terminal device. That the method is performed by the second terminal device is used as an example for description.

The method includes: The second terminal device receives indication information from a first terminal device, where the indication information indicates a first time unit and a second time unit, the first time unit is used by the second terminal device to send channel state information CSI and first data that are of a sidelink to the first terminal device, the second time unit is used by the second terminal device to send the CSI to the first terminal device, the first time unit is earlier than the second time unit in time domain, and the first data is data sent by the second terminal device to the first terminal device; the second terminal device receives a reference signal RS from the first terminal device; the second terminal device determines the CSI based on the RS; and the second terminal device sends, in the first time unit, the CSI and the first data to the first terminal device, or sends, in the second time unit, the CSI to the first terminal device. The first data is data sent by the second terminal device to the first terminal device.

According to the sidelink channel state information transmission method provided in the fourth aspect, the first time unit and the second time unit are configured, where both the CSI and the data are transmitted in the first time unit, and only the CSI is transmitted in the second time unit. Even if there is no data transmission, normal transmission of the CSI is ensured, and therefore CSI feedback is ensured. In addition, it is specified that sending only the CSI by using a PSSCH is performed exclusively in the second time unit, so that resource consumption caused by sending only the CSI by using the PSSCH is reduced, and resource utilization is improved.

In a possible implementation of the fourth aspect, the first data is broadcast data or multicast data, and that the second terminal device sends, in the first time unit, the CSI and the first data to the first terminal device includes: The second terminal device sends, in the first time unit, the CSI, an identifier of the first terminal device, and the broadcast data or the multicast data to the first terminal device.

In a possible implementation of the fourth aspect, the CSI includes a channel quality indicator CQI value corresponding to the sidelink, or the CSI includes a CQI table corresponding to the sidelink and a CQI value in the CQI table.

In a possible implementation of the fourth aspect, the method further includes: The second terminal device receives, from the first terminal device, CQI table indication information corresponding to the sidelink, where the CQI table indication information indicates the CQI table corresponding to the sidelink, and the CQI table indication information includes a priority and/or a quality of service corresponding to data received by the second terminal device from the first terminal device on the sidelink; and the second terminal device determines, based on the CQI table indication information, the CQI table corresponding to the sidelink.

In a possible implementation of the fourth aspect, that the second terminal device receives the CQI table indication information from the first terminal device includes: The second terminal device receives first sidelink control information SCI from the first terminal device, where the first SCI is used to schedule the data received by the second terminal device from the first terminal device on the sidelink, the first SCI includes a priority field and/or a quality of service indication field, and the priority field or the quality of service indication field indicates the priority and/or the quality of service corresponding to the data.

In a possible implementation of the fourth aspect, the method further includes: The second terminal device receives the first sidelink control information SCI from the first terminal device, where the first SCI includes an indication field, the indication field in the first SCI indicates a modulation and coding scheme MCS table corresponding to the data received by the second terminal device from the first terminal device on the sidelink, and the first SCI is used to schedule the data received by the second terminal device from the first terminal device on the sidelink.

In a possible implementation of the fourth aspect, the indication field in the first SCI is the priority field and/or the quality of service indication field in the first SCI, and the priority field or the quality of service indication field indicates the priority and/or the quality of service corresponding to the data.

In a possible implementation of the fourth aspect, the CSI is carried in second SCI that is sent by the second terminal device to the first terminal device.

According to a fifth aspect, a sidelink channel quality indicator determining method is provided. The method may be performed by a first terminal device, or may be performed by a chip used in the first terminal device. That the method is performed by the first terminal device is used as an example for description.

The method includes: The first terminal device generates channel quality indicator CQI table indication information corresponding to a sidelink, where the CQI table indication information indicates a CQI table corresponding to the sidelink, and the sidelink is a sidelink between a second terminal device and the first terminal device; and the first terminal device sends the CQI table indication information to the second terminal device.

According to the sidelink channel quality indicator determining method provided in the fifth aspect, the first terminal device indicates the CQI table to the second terminal device. In a V2X communication system, even if the first terminal device and the second terminal device are not in coverage of a network device, the first terminal device sends the CQI table indication information to the second terminal device, so that the second terminal device can still accurately determine the CQI table and further determine a CQI value in the CQI table. This improves efficiency and reliability of determining the CQI table by the second terminal device.

In a possible implementation of the fifth aspect, the CQI table indication information includes a priority and/or a quality of service corresponding to data sent by the first terminal device to the second terminal device.

In a possible implementation of the fifth aspect, that the first terminal device sends the CQI table indication information to the second terminal device includes: The first terminal device sends first sidelink control information SCI to the second terminal device, where the first SCI is used to schedule the data sent by the first terminal device to the second terminal device, the first SCI includes a priority field and/or a quality of service indication field, and the priority field or the quality of service indication field indicates the priority and/or the quality of service corresponding to the data.

In a possible implementation of the fifth aspect, the method further includes: The first terminal device receives, from the second terminal device, the CQI value, or the CQI table and the CQI value in the CQI table. This implementation helps the first terminal device select proper MCS parameters (for example, a modulation order and a code rate) based on the CQI table and the CQI value in the CQI table, to send data to the second terminal device. This improves reliability of sending the data by the first terminal device to the second terminal device and improves a spectral efficiency.

According to a sixth aspect, a sidelink channel quality indicator determining method is provided. The method may be performed by a second terminal device, or may be performed by a chip used in the second terminal device. That the method is performed by the second terminal device is used as an example for description.

The method includes: The second terminal device determines a channel quality indicator CQI table corresponding to a sidelink, where the sidelink is a sidelink between the second terminal device and a first terminal device; and the second terminal device determines a CQI value in the CQI table based on the CQI table.

According to the sidelink channel quality indicator determining method provided in the sixth aspect, the second terminal device determines the CQI table corresponding to the sidelink, and then determines the CQI value in the CQI table. In a V2X communication system, even if the first terminal device and the second terminal device are not in coverage of a network device, the second terminal device accurately determines the CQI table and further determines the CQI value in the CQI table, so that determining of a channel quality corresponding to the sidelink is facilitated.

In a possible implementation of the sixth aspect, the method further includes: The second terminal device receives, from the first terminal device, CQI table indication information corresponding to the sidelink, where the CQI table indication information indicates the CQI table. That the second terminal device determines the channel quality indicator CQI table corresponding to the sidelink includes: The second terminal device determines the CQI table based on the CQI table indication information. In this implementation, the second terminal device receives the CQI table indication information, so that in a V2X communication system, even if the second terminal device is not in coverage of a network device, the second terminal device can still accurately determine the CQI table and further determine the CQI value in the CQI table. This improves efficiency and reliability of determining the CQI table by the second terminal device.

In a possible implementation of the sixth aspect, the CQI table indication information includes a priority and/or a quality of service corresponding to data sent by the first terminal device to the second terminal device.

In a possible implementation of the sixth aspect, that the second terminal device receives the CQI table indication information from the first terminal device includes: The second terminal device receives first sidelink control information SCI from the first terminal device, where the first SCI is used to schedule the data received by the second terminal device from the first terminal device, the first SCI includes a priority field and/or a quality of service indication field, and the priority field or the quality of service indication field indicates the priority and/or the quality of service corresponding to the data.

In a possible implementation of the sixth aspect, the method further includes: The second terminal device sends, to the first terminal device, the CQI value, or the CQI table and the CQI value in the CQI table.

According to a seventh aspect, a sidelink modulation and coding scheme information determining method is provided. The method may be performed by a first terminal device, or may be performed by a chip used in the first terminal device. That the method is performed by the first terminal device is used as an example for description.

The method includes: The first terminal device generates modulation and coding scheme MCS table indication information, where the MCS table indication information indicates a modulation and coding scheme MCS table corresponding to data sent by the first terminal device to a second terminal device; and the first terminal device sends the MCS table indication information to the second terminal device.

According to the sidelink modulation and coding scheme information determining method provided in the seventh aspect, in a V2X communication system, even if the first terminal device and the second terminal device are not in coverage of a network device, the first terminal device sends the MCS table indication information to the second terminal device, so that the second terminal device can still accurately determine the MCS table and further determine an MCS parameter in the MCS table. This improves efficiency and reliability of determining the MCS table by the second terminal device. Therefore, the second terminal device correctly receives, based on the MCS parameter, the data sent by the first terminal device, thereby improving reliability of data transmission between the first terminal device and the second terminal device.

In a possible implementation of the seventh aspect, the MCS table indication information includes an indication field in first sidelink control information SCI, the indication field in the first SCI indicates the MCS table, and the first SCI is used to schedule the data sent by the first terminal device to the second terminal device.

In a possible implementation of the seventh aspect, the indication field in the first SCI includes a priority field and/or a quality of service indication field in the first SCI, and the priority field or the quality of service indication field indicates a priority and/or a quality of service corresponding to the data.

In a possible implementation of the seventh aspect, the MCS table indication information is carried in medium access control MAC information, a system information block SIB, a master information block MIB, or broadcast channel information; the MAC information, the SIB, the MIB, or the broadcast channel information includes a second indication field; and the second indication field indicates the MCS table.

In a possible implementation of the seventh aspect, the MCS table indication information includes a service type corresponding to the data, or a cyclic redundancy check CRC mask type or scrambling type corresponding to the data; and the service type corresponding to the data, or the CRC mask type or scrambling type corresponding to the data indicates the MCS table.

In a possible implementation of the seventh aspect, the MCS table indication information includes a format of the first sidelink control information SCI, and the first SCI is used to schedule the data sent by the first terminal device to the second terminal device.

In a possible implementation of the seventh aspect, the MCS table indication information includes a cyclic redundancy check CRC mask type of the first sidelink control information SCI, and the first SCI is used to schedule the data sent by the first terminal device to the second terminal device.

In a possible implementation of the seventh aspect, the MCS table indication information includes an identifier of a resource pool for sending the data, and there is a correspondence between the resource pool and the MCS table.

According to an eighth aspect, a sidelink modulation and coding scheme information determining method is provided. The method may be performed by a second terminal device, or may be performed by a chip used in the second terminal device. That the method is performed by the second terminal device is used as an example for description.

The method includes: The second terminal device receives modulation and coding scheme MCS table indication information, where the MCS table indication information indicates a modulation and coding scheme MCS table corresponding to data received by the second terminal device from a first terminal device; and the second terminal device determines the MCS table based on the MCS table indication information.

According to the sidelink modulation and coding scheme information determining method provided in the eighth aspect, in a V2X communication system, even if the first terminal device and the second terminal device are not in coverage of a network device, the second terminal device receives the MCS table indication information sent by the first terminal device, so that the second terminal device can still accurately determine the MCS table and further determine an MCS parameter in the MCS table. This improves efficiency and reliability of determining the MCS table by the second terminal device. Therefore, the second terminal device correctly receives, based on the MCS parameter, the data sent by the first terminal device, thereby improving reliability of data transmission between the first terminal device and the second terminal device.

In a possible implementation of the eighth aspect, the MCS table indication information includes an indication field in first sidelink control information SCI, the indication field in the first SCI indicates the MCS table, and the first SCI is used to schedule the data received by the second terminal device from the first terminal device.

In a possible implementation of the eighth aspect, the indication field in the first SCI is a priority field and/or a quality of service indication field in the first SCI, and the priority field or the quality of service indication field indicates a priority and/or a quality of service corresponding to the data.

In a possible implementation of the eighth aspect, the MCS table indication information includes medium access control MAC information, a system information block SIB, a master information block MIB, or broadcast channel information; the MAC information, the SIB, the MIB, or the broadcast channel information includes a second indication field; and the second indication field indicates the MCS table.

In a possible implementation of the eighth aspect, the MCS table indication information includes a service type corresponding to the data, or a cyclic redundancy check CRC mask type or scrambling type corresponding to the data; and the service type corresponding to the data, or the CRC mask type or scrambling type corresponding to the data indicates the MCS table.

In a possible implementation of the eighth aspect, the MCS table indication information includes a format of the first sidelink control information SCI, and the first SCI is used to schedule the data received by the second terminal device from the first terminal device on the sidelink.

In a possible implementation of the eighth aspect, the MCS table indication information includes a cyclic redundancy check CRC mask type of the first sidelink control information SCI, and the first SCI is used to schedule the data received by the second terminal device from the first terminal device.

In a possible implementation of the eighth aspect, the MCS table indication information includes an identifier of a resource pool for receiving the data, and there is a correspondence between the resource pool and the MCS table.

According to a ninth aspect, a communication apparatus is provided. The apparatus includes units configured to perform the steps in any one of the first aspect or the possible implementations of the first aspect, the third aspect or the possible implementations of the third aspect, the fifth aspect or the possible implementations of the fifth aspect, and the seventh aspect or the possible implementations of the seventh aspect.

According to a tenth aspect, a communication apparatus is provided. The apparatus includes units configured to perform the steps in any one of the second aspect or the possible implementations of the second aspect, the fourth aspect or the possible implementations of the fourth aspect, the sixth aspect or the possible implementations of the sixth aspect, and the eighth aspect or the possible implementations of the eighth aspect.

According to an eleventh aspect, a communication apparatus is provided. The apparatus includes at least one processor and a memory, and the at least one processor is configured to perform the method according to any one of the first aspect or the possible implementations of the first aspect, the third aspect or the possible implementations of the third aspect, the fifth aspect or the possible implementations of the fifth aspect, and the seventh aspect or the possible implementations of the seventh aspect.

According to a twelfth aspect, a communication apparatus is provided. The apparatus includes at least one processor and a memory, and the at least one processor is configured to perform the method according to any one of the second aspect or the possible implementations of the second aspect, the fourth aspect or the possible implementations of the fourth aspect, the sixth aspect or the possible implementations of the sixth aspect, and the eighth aspect or the possible implementations of the eighth aspect.

According to a thirteenth aspect, a communication apparatus is provided. The apparatus includes at least one processor and an interface circuit, and the at least one processor is configured to perform the method according to any one the first aspect or the possible implementations of the first aspect, the third aspect or the possible implementations of the third aspect, the fifth aspect or the possible implementations of the fifth aspect, and the seventh aspect or the possible implementations of the seventh aspect.

According to a fourteenth aspect, a communication apparatus is provided. The apparatus includes at least one processor and an interface circuit, and the at least one processor is configured to perform the method according to any one of the second aspect or the possible implementations of the second aspect, the fourth aspect or the possible implementations of the fourth aspect, the sixth aspect or the possible implementations of the sixth aspect, and the eighth aspect or the possible implementations of the eighth aspect.

According to a fifteenth aspect, a terminal device is provided. The terminal device includes the communication apparatus provided in the ninth aspect, the terminal device includes the communication apparatus provided in the eleventh aspect, or the terminal device includes the communication apparatus provided in the thirteenth aspect.

According to a sixteenth aspect, a terminal device is provided. The terminal device includes the communication apparatus provided in the tenth aspect, the terminal device includes the communication apparatus provided in the twelfth aspect, or the terminal device includes the communication apparatus provided in the fourteenth aspect.

According to a seventeenth aspect, a computer program product is provided. The computer program product includes a computer program; and when being executed by a processor, the computer program is used to perform the method according to any one of the first aspect to the eighth aspect or the possible implementations of the first aspect to the eighth aspect.

According to an eighteenth aspect, a computer-readable storage medium is provided. The computer-readable storage medium stores a computer program; and when being executed, the computer program is used to perform the method according to any one of the first aspect to the eighth aspect or the possible implementations of the first aspect to the eighth aspect.

According to a nineteenth aspect, a chip is provided. The chip includes a processor, configured to invoke a computer program from a memory and run the computer program, so that an apparatus in which the chip is installed performs the method according to any one of the foregoing aspects or the possible implementations of the foregoing aspects.

DETAILED DESCRIPTION OF ILLUSTRATIVE EMBODIMENTS

Figure 1:
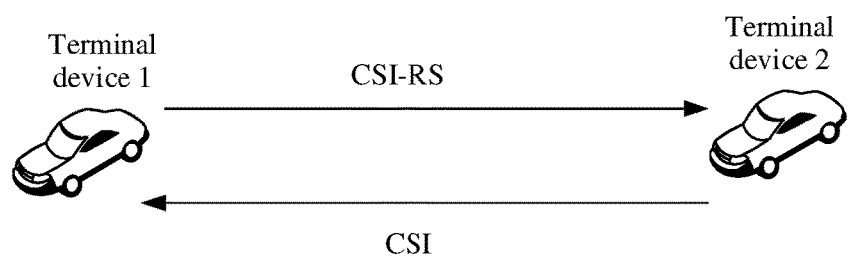
FIG. 1 is a schematic diagram of CSI measurement and sending in V2X communication.

The following describes technical solutions in this application with reference to the accompanying drawings.

The technical solutions of embodiments of this application may be applied to various communication systems, for example, a V2X or device-to-device (device to device, D2D) communication system, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th generation (5G) system, or a new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communication device, a user agent or a user apparatus, or a vehicle, a vehicle-mounted device, or the like in a V2X communication system. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with a terminal device. The network device may be a base transceiver station (BTS) in a global system for mobile communications (GSM) system or a code division multiple access (CDMA) system, or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in the embodiments of this application.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), or a memory (also referred to as a main memory). The operating system may be any one or more of computer operating systems implementing service processing through a process, for example, a Linux operating system, a Unix operating system, an Android operating system, an iOS operating system, and a Windows operating system. The application layer includes applications such as a browser, an address book, word processing software, and instant messaging software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by a terminal device, a network device, or a function module that is in a terminal device or a network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable medium" may include but is not limited to a radio channel, and various other media that can store, contain, and/or carry instructions and/or data.

CSI is channel state information reported by a transmit end (for example, a terminal device) to a receive end (for example, a network device), and includes a channel quality indicator (CQI), a precoding matrix indicator (PMI), and a channel matrix rank indication (RI).

Feedback of the CQI determines a coding scheme and a modulation scheme, and the network device implements adaptive modulation coding (AMC) by determining a value of the CQI. A CQI value may be estimated and calculated based on a channel condition, noise, and interference. For example, if a CQI value fed back by the terminal device is large, the network device selects a high-order modulation scheme, for example, 64 quadrature amplitude modulation (64QAM). On the contrary, if a CQI value that is fed back is small, the network device selects a low-order modulation scheme, for example, quadrature phase shift keying (QPSK), and uses a coding scheme (¼ coding) with relatively large redundancy. Therefore, a throughput of a system is small. When there is only one codeword, only one CQI value needs to be fed back. However, in a multiple-input multiple-output (MIMO) system using two codewords, two CQI values need to be fed back.

A value of the spatial channel rank (RI) describes a maximum quantity of unrelated data transmission channels of a spatial channel between the terminal device and the network device. A rank of the spatial channel changes continuously, and the value of the RI determines selection space of a layer mapping manner. Rank adaptation is layer mapping adaptation. A rank indication of the terminal device is fed back by using uplink and downlink control information.

The PMI determines a correspondence between layer data flows and antenna ports. In codebook-based closed-loop spatial multiplexing and closed-loop transmit diversity modes, once a quantity of layers and a quantity of antenna ports are determined, a set of optional codebooks for precoding is determined. The network device selects a precoding matrix with optimal performance based on the PMI fed back by the terminal device.

A terminal device obtains CSI by measuring a received reference signal (RS), for example, a cell-specific reference signal, a channel state information reference signal (CSI-RS), or a demodulation reference signal (DMRS), and reports the CSI to a network device. The network device may adjust a coding scheme, a modulation scheme, a quantity of layers, a precoding matrix, and the like based on the CSI; determine an antenna mode, a modulation scheme, a coding scheme, and the like for downlink data transmission; and then send data on a physical downlink shared channel (PDSCH) in a determined manner. Specifically, the network device configures, by using radio resource control (RRC) signaling, a CQI table used by the terminal device. After receiving the configured CQI table, the terminal determines a row of parameters in the CQI table (CQI-table) indicated by the network device. A row of parameters in the CQI table may include parameters such as a CQI index, a modulation scheme (modulation), a code rate, and a spectral efficiency. The terminal device reports an index (a CQI value) corresponding to the row of parameters to the network device. After the terminal device reports the CQI value to the network device, the network device performs matching with a corresponding modulation order and a corresponding code rate in the configured CQI table, and uses the corresponding modulation order and the corresponding code rate as references for subsequent downlink data scheduling. That is, the network device further configures, for the terminal device by using RRC signaling, an MCS table used to send downlink data, and notifies, with reference to downlink control information (DCI), the terminal device of a used MCS index, where the MCS index is used to identify a row in the MCS table. The terminal device may learn of, based on the indicated MCS index and MCS table, an MCS parameter used by the network device to send the data, so that the terminal device correctly receives the data.

Vehicle-to-everything (vehicle to everything, V2X) communication is an important key technology for implementing environment perception and information exchange in an internet of vehicles. Everything herein may be another vehicle, another infrastructure, a pedestrian, a terminal device, or the like. The V2X communication may be considered as a special case of device-to-device (device to device, D2D) communication. A communication link in V2X may be referred to as a sidelink (side link, SL), and the sidelink is a link for communication between a terminal device and a terminal device. For example, the sidelink may be a link for vehicle-to-vehicle communication. For example, the vehicle-to-vehicle (vehicle to vehicle, V2V) communication may be considered as a special case of the V2X communication. Through direct communication between vehicles, status information and a road condition of another vehicle can be obtained in real time, to better assist vehicle driving or even implement self-driving.

Currently, the V2X communication includes two communication modes. A first communication mode is V2X communication that is based on scheduling performed by a network device (for example, a base station), and user equipment (which may be, for example, a vehicle or a vehicle-mounted device) in V2X sends a control message and data for the V2X communication on a scheduled time-frequency resource based on scheduling information of the network device. In a second communication mode, user equipment in V2X independently selects, from available time-frequency resources included in a preconfigured V2X communication resource pool (which may also be referred to as a V2X resource set), a time-frequency resource used for the V2X communication. For example, the user equipment in V2X may obtain the resource in a sensing process. The user equipment obtains information about resource occupation of another user equipment by decoding sidelink control information (side link control information, SCI) of the another user equipment or performing SL measurement, and selects the resource based on a result of sensing. The SL measurement is performed based on a value of a reference signal received power (RSRP) of a corresponding sidelink demodulation reference signal (side link demodulation reference signal, SL DMRS) when the SCI is decoded.

In a V2X communication system, a physical sidelink control channel (PSCCH) is used to transmit control information in V2X communication, and a physical sidelink shared channel (PSSCH) is used to transmit data in V2X communication. FIG. 1 is a schematic diagram of CSI measurement and sending in V2X communication. A terminal device 1 sends a PSSCH (sidelink data) to a terminal device 2, where the PSSCH includes a CSI-RS. After receiving the CSI-RS, the terminal device 2 performs CSI measurement, to generate CSI. The CSI is CSI of a sidelink between the terminal device 1 and the terminal device 2. The terminal device 2 feeds back the CSI to the terminal device 1 by using a PSSCH. The CSI includes a CQI and an RI that are corresponding to the sidelink between the terminal device 1 and the terminal device 2.

In a V2X communication system, a sending device sends a reference signal to a receiving device. After receiving the reference signal, the receiving device generates a CSI report, and then sends the CSI to the sending device by including the CSI in a PSSCH. However, the receiving device does not always have data that is to be sent to the sending device. The receiving device may send only the CSI to the sending device when there is no data. However, because a quantity of bits of the CSI is relatively small, and even less than a quantity of bits of SCI that schedules the CSI, low resource utilization may be caused. Consequently, reliability of CSI transmission on a sidelink is low. In addition, in configuration of a CQI-table and an MCS-table, because the sending device and the receiving device are affected by moving speeds, a change periodicity of a quality of the sidelink between the sending device and the receiving device may be relatively short. An effect of configuring the CQI-table and the MCS table by a network device deteriorates. In addition, in the second communication mode, the sending device and the receiving device may not be in coverage of the network device. In this case, the network device cannot configure the CQI-table or the MCS table for the sending device and the receiving device. For CSI measurement and feedback, if no CQI table is configured for the receiving device, the receiving device cannot determine a CQI value based on a CQI table. For data sending and receiving, if no MCS table is configured for the receiving device, the receiving device cannot determine an MCS parameter used to parse data. This reduces reliability and efficiency of sidelink data transmission, and even data demodulation and decoding cannot be completed.

In view of this, this application provides a sidelink channel state information transmission method. A time window used for CSI feedback is configured on a sidelink. The time window includes a first time interval and a second time interval, where both CSI and data are sent in the first time interval, and the second time interval for sending only the CSI is configured (preconfigured) at the end of the time window. This ensures the CSI feedback in the valid time period. In addition, it is specified that sending only the CSI is performed exclusively in the second time interval, so that resource consumption caused by sending only the CSI is reduced, resource utilization is improved, and reliability of sidelink CSI transmission is ensured.

For ease of understanding the embodiments of this application, communication systems to which the embodiments of this application are applicable are first briefly described with reference to FIG. 2 and FIG. 3.

Figure 2:
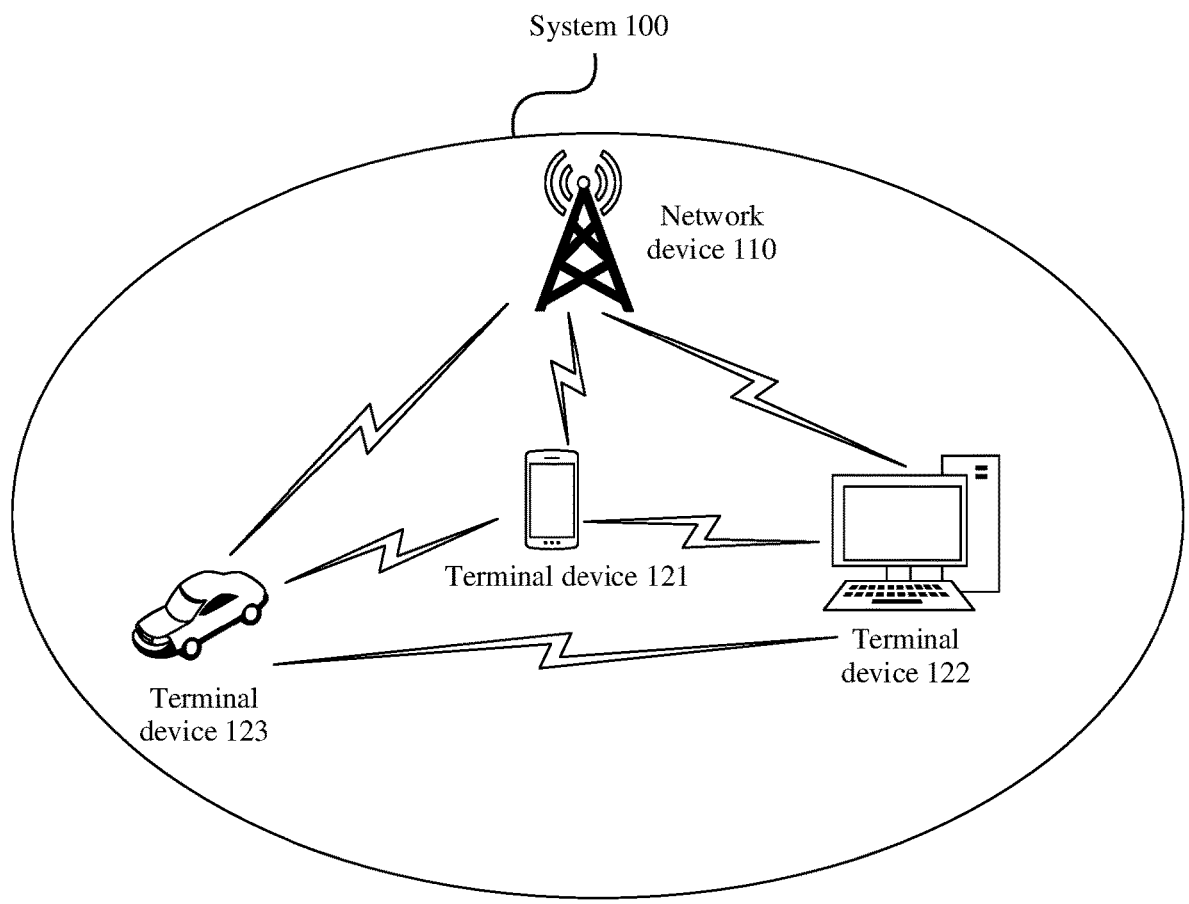
FIG. 2 is a schematic architectural diagram of a mobile communication system to which an embodiment of this application is applicable.

FIG. 2 is a schematic diagram of a communication system 100 to which a communication method according to an embodiment of this application is applicable. As shown in FIG. 2, the communication system 100 includes four communication devices, for example, a network device no and terminal devices 121 to 123. The terminal devices may perform data communication with each other in a D2D or V2X communication mode, and the network device no may perform data communication with at least one of the terminal devices 121 to 123. For the terminal devices 121 to 123, a direct link between every two of the terminal devices 121 to 123 is an SL. For example, when the terminal devices 121 and 123 perform CSI transmission, the CSI transmission may be performed according to the sidelink channel state information transmission method in the embodiments of this application.

Figure 3:
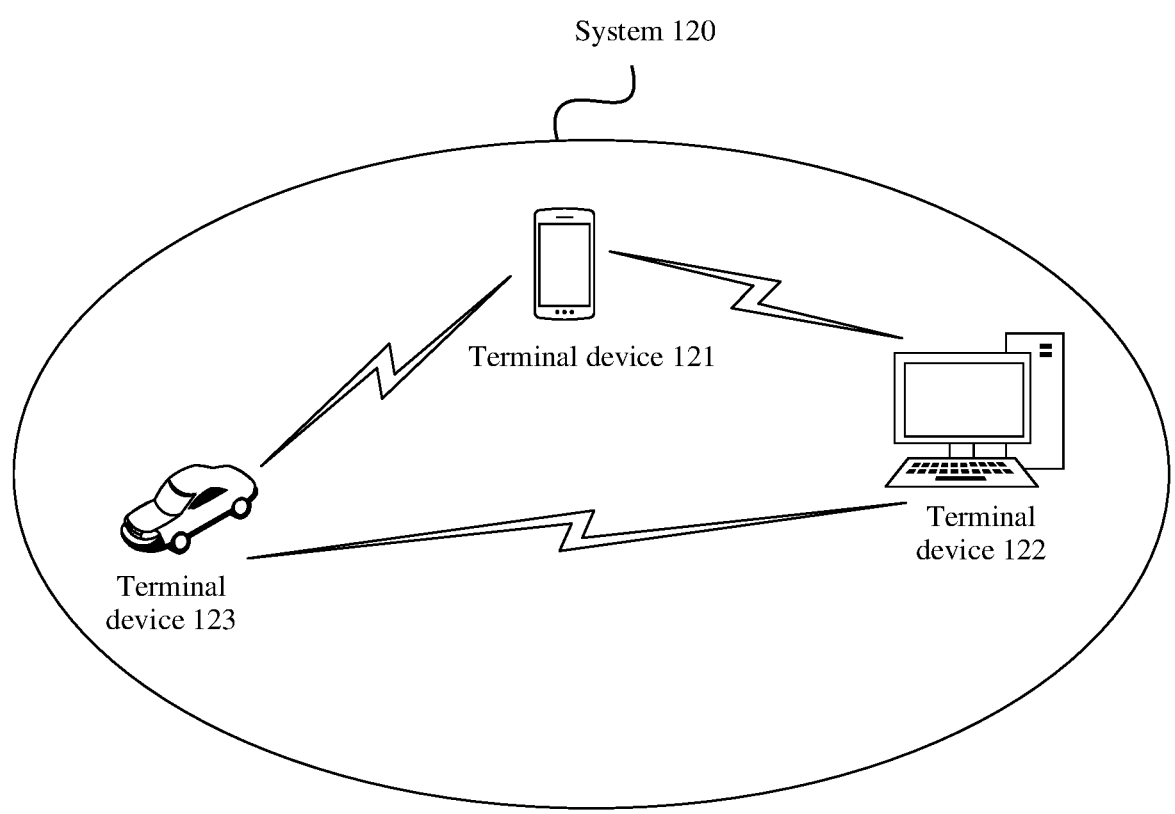
FIG. 3 is a schematic architectural diagram of another mobile communication system to which an embodiment of this application is applicable.

FIG. 3 is a schematic diagram of another communication system 120 to which a communication method according to an embodiment of this application is applicable. As shown in FIG. 3, the communication system 120 includes three communication devices, for example, terminal devices 121 to 123. The terminal devices may perform data communication with each other in a D2D or V2X communication mode. For the terminal devices 121 to 123, a link between every two of the terminal devices 121 to 123 is an SL. For example, when the terminal devices 123 and 122 perform CSI transmission, the CSI transmission may be performed according to the sidelink CSI transmission method in the embodiments of this application.

It should be understood that the communication systems shown in FIG. 2 and FIG. 3 may further include more network nodes, for example, a terminal device or a network device. The network devices or terminal devices included in the communication systems shown in FIG. 2 and FIG. 3 may be the network devices or terminal devices in the foregoing various forms. These are not shown one by one in the figures in the embodiments of this application.

Figure 4:
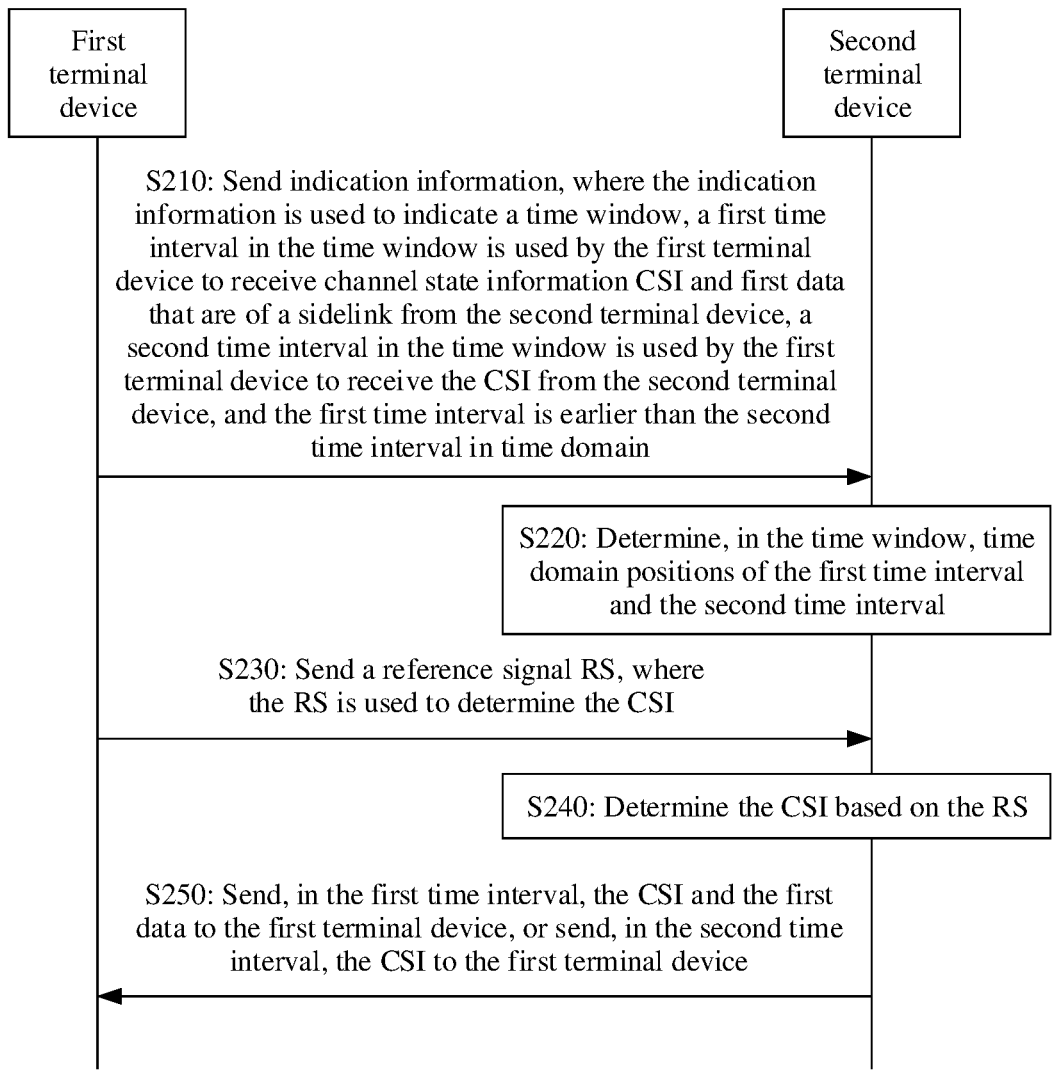
FIG. 4 is a schematic interaction diagram of a sidelink channel state information transmission method according to an embodiment of this application.

The following describes in detail the sidelink channel state information transmission method provided in this application with reference to FIG. 4. FIG. 4 is a schematic interaction diagram of a sidelink channel state information transmission method 200 according to an embodiment of this application. The method 200 may be applied to the scenarios shown in FIG. 1, FIG. 2, and FIG. 3; and certainly, may also be applied to another communication scenario. This is not limited in this embodiment of this application.

It should be further understood that in this embodiment of this application, the method is described by using an example in which the method is performed by a first terminal device and a second terminal device. By way of example, and not limitation, the method may alternatively be performed by chips, chip systems, processors, or the like used in the first terminal device and the second terminal device. When the method 200 is applied to a V2X communication system, the first terminal device and/or the second terminal device may be a vehicle/vehicles, a vehicle-mounted device/vehicle-mounted devices, a mobile phone/mobile phones, or the like in V2X communication.

As shown in FIG. 4, the method 200 shown in FIG. 4 may include S210 to S250. The following describes in detail the steps in the method 200 with reference to FIG. 4.

S210: The first terminal device sends indication information to the second terminal device, where the indication information indicates a first time interval and a second time interval. Alternatively, the indication information indicates a valid time window, the indication information indicates the time window, a first time interval in the time window is used by the first terminal device to receive channel state information CSI and first data that are of a sidelink from the second terminal device, a second time interval in the time window is used by the first terminal device to receive the CSI from the second terminal device, and the first time interval is earlier than the second time interval in time domain. Correspondingly, the second terminal device receives the indication information.

S220: The second terminal device determines, in the time window, time domain positions of the first time interval and the second time interval.

S230: The first terminal device sends a reference signal RS to the second terminal device. Correspondingly, the second terminal device receives the RS.

S240: The second terminal device determines the CSI based on the RS.

S250: The second terminal device sends, in the first time interval, the CSI and the first data to the first terminal device, or sends, in the second time interval, the CSI to the first terminal device. Correspondingly, the first terminal device receives, in the first time interval, the CSI from the second terminal device, or receives, in the second time interval, the CSI from the second terminal device.

In S210, when the first terminal device needs to learn of the CSI of the sidelink between the first terminal device and the second terminal device, the first terminal device sends the indication information (or may be referred to as configuration information) to the second terminal device, to configure the time window (or may be referred to as the valid time window) for the second terminal device. The time window may be understood as a time period. The time window may be understood as a valid time period for CSI feedback. After the time window expires, because the CSI cannot reflect a channel quality of the sidelink, the first terminal device does not expect or does not receive the CSI that is fed back by the second terminal device and that is in response to the RS. The valid time window includes the first time interval and the second time interval. The first time interval in the time window is used by the first terminal device to receive the channel state information CSI and the first data that are of the sidelink from the second terminal device, the second time interval in the time window is used by the first terminal device to receive the CSI from the second terminal device, and the first time interval is earlier than the second time interval in time domain. The first data is sidelink data sent by the second terminal device to the first terminal device.

In this embodiment of this application, a time length of the time window may be one or more subframes, one or more slots, or one or more symbols. The symbol is also referred to as a time domain symbol, and may be an orthogonal frequency division multiplexing (OFDM) symbol or a single carrier frequency division multiple access (SC-FDMA) symbol, where SC-FDMA is also referred to as orthogonal frequency division multiplexing with transform precoding (OFDM with TP). Optionally, the time length of the time window may alternatively be represented by using an absolute time length. For example, a unit of the time length of the time window may alternatively be represented by using an absolute time unit (for example, a microsecond (μs) or a millisecond (ms)).

In this embodiment of this application, the first time interval and the second time interval may be understood as two time periods. A length of the first time interval may be different from a length of the second time interval. For example, the time length of the first time interval may be greater than the time length of the second time interval. In addition, the first time interval is earlier than the second time interval in time domain.

In this embodiment of this application, the time length of the first time interval or the time length of the second time interval may be represented by using a subframe, a symbol, or a slot. For example, the time length of the first time interval or the time length of the second time interval is S subframes, M symbols, or N slots. Optionally, the time length of the first time interval or the time length of the second time interval may alternatively be represented by using an absolute time unit (for example, a microsecond (μs) or a millisecond (ms)). For example, the time length of the first time interval or the time length of the second time interval is P ms, where P is a positive integer.

In this embodiment of this application, a sum of the time length of the first time interval and the time length of the second time interval may be the time length of the time window. For example, if the time length of the time window is 10 slots or symbols, the first time interval may include the first nine slots or symbols, and the second time interval includes the last one slot or symbol. For another example, if the time length of the time window is 20 ms, the first time interval may include the first 15 ms, and the second time interval includes the last 5 ms. Optionally, the sum of the time length of the first time interval and the time length of the second time interval may alternatively be less than the time length of the time window.

For example, the indication information may be SCI sent by the first terminal device to the second terminal device. The SCI may be carried on a PSCCH sent by the first terminal device to the second terminal device.

In S220, the second terminal device determines, in the time window, the time domain positions of the first time interval and the second time interval. For example, the second terminal device may determine, in the time window, the time domain positions of the first time interval and the second time interval according to a preset calculation rule. Alternatively, the time domain positions of the first time interval and the second time interval in the time window may be predefined in a protocol.

In S230, the first terminal device sends the RS to the second terminal device, where the RS is used to determine the CSI of the sidelink between the first terminal device and the second terminal device. For example, the RS may be carried on a PSSCH sent by the first terminal device to the second terminal device. The RS may include a cell-specific reference signal, a channel state information reference signal (CSI-RS), a demodulation reference signal (DMRS), and the like. Correspondingly, the second terminal device receives the RS.

In S240, the second terminal device determines the CSI of the sidelink based on the RS. That is, the CSI of the sidelink between the first terminal device and the second terminal device is determined.

In S250, the second terminal device sends, in the first time interval, the CSI and the first data to the first terminal device, or sends, in the second time interval, the CSI to the first terminal device. In other words, if the second terminal device has, in the first time interval, the first data that is to be sent to the first terminal device, both the CSI and the first data are carried on a PSSCH and sent to the first terminal device. If the second terminal device does not have, in the first time interval, the first data that is to be sent to the first terminal device, the second terminal device sends, in the second time interval, only the CSI to the first terminal device by including the CSI in a PSSCH.

According to the sidelink channel state information transmission method provided in this application, the time window for the CSI feedback is configured, and the time window includes the first time interval used to feed back both the data and the CSI and the second time interval used to feed back only the CSI. Even if there is no data transmission, normal transmission of the CSI is ensured, and therefore the CSI feedback is ensured. In addition, it is specified that sending only the CSI is performed exclusively in the second time interval, so that resource consumption caused by sending only the CSI by using the PSSCH is reduced, and resource utilization is improved.

It should be understood that in this embodiment of this application, moving speeds of the first terminal device and the second terminal device may cause different channel quality changes of the sidelink, and the channel quality changes cause different valid time periods of a CSI measurement report. Therefore, the time length of the time window, the time length of the first time interval, and the time length of the second time interval may be determined based on the moving speeds of the first terminal device and the second terminal device.

Optionally, in this embodiment of this application, the time window may be selected from a preconfigured time set. For example, the preconfigured time set is {T1, T2, T3, T4}, where T1, T2, T3, and T4 may be values obtained through simulation. In this case, for the time window, a value of the time window may be indicated by using two bits in the indication information.

Optionally, in this embodiment of this application, a timing start time point (moment) of the time window may be a time point (moment) at which the first terminal device triggers the second terminal device to report the CSI. For example, the first terminal device may send CSI trigger information (signaling) to the second terminal device, to trigger the second terminal device to report the CSI. In this case, the timing start time point of the time window may be a time point at which the second terminal device receives the trigger information. For another example, the timing start time point of the time window may be a time point at which the second terminal device receives the RS or a time point at which the first terminal device sends the RS. Alternatively, the timing start time point of the time window may be predefined. The timing start time point (moment) of the time window is not limited in this embodiment of this application.

Optionally, in this embodiment of this application, the indication information further indicates a time domain position of the first time interval in the time window and/or a time domain position of the second time interval in the time window. For example, the indication information may indicate the time domain position occupied by the first time interval in the time window. The second terminal device may determine, based on the indication information, the time domain position occupied by the first time interval in the time window. If the second terminal device has, in the first time interval, the first data that is to be sent to the first terminal device, the second terminal device sends both the first data and the CSI to the first terminal device. If the second terminal device does not have, in the first time interval, the data that is to be sent to the first terminal device, the second terminal device sends, in the remaining second time interval other than the first time interval in the time window, the CSI to the first terminal device. Correspondingly, the first terminal device detects the first data and the CSI in the first time interval, and detects only the CSI in the second time interval. For another example, the indication information may indicate the time domain position occupied by the second time interval in the time window. In this case, the second terminal device may determine, based on the time domain position occupied by the second time interval in the time window and the time length of the time window, the time domain position occupied by the first time interval in the time window. This may improve efficiency and accuracy of determining the time domain position of the first time interval in the time window and/or the time domain position of the second time interval in the time window by the second terminal device.

It should be understood that for a manner in which the indication information indicates the time domain position of the first time interval in the time window and/or the time domain position of the second time interval in the time window, refer to the following descriptions. For example, the time domain position of the first time interval in the time window and/or the time domain position of the second time interval in the time window may be directly indicated. For another example, a calculation rule, a calculation method, or the like of the time domain position of the first time interval in the time window and/or the time domain position of the second time interval in the time window may alternatively be indicated. The second terminal device may determine, based on the calculation rule or the calculation method, the time domain position of the first time interval in the time window and/or the time domain position of the second time interval in the time window. A specific manner in which the indication information indicates the time domain position of the first time interval in the time window and/or the time domain position of the second time interval in the time window is not limited in this embodiment of this application.

Optionally, in this embodiment of this application, the time domain position of the first time interval in the time window and/or the time domain position of the second time interval in the time window are/is predefined. For example, the time domain position of the first time interval in the time window and/or the time domain position of the second time interval in the time window is predefined in a protocol or is preconfigured. Optionally, a time proportion occupied by the first time interval or the second time interval in the time window may be predefined or preconfigured. For example, the first time interval occupies the first 90% of the valid time window, and the second time interval occupies the last 10% of the valid time window. Optionally, the time domain position occupied by the first time interval in the time window or the time domain position occupied by the second time interval in the time window may alternatively be predefined or preconfigured. For example, it is assumed that the length of the time window is M slots (or subframes). In this case, it may be predefined or preconfigured that the second time interval is the last slot (or subframe). Optionally, a calculation rule, a calculation method, or the like of the time domain position of the first time interval in the time window or the time domain position of the second time interval in the time window may alternatively be predefined or preconfigured. The first terminal device does not need to indicate, to the second terminal device, the time domain position of the first time interval in the time window and/or the time domain position of the second time interval in the time window, so that signaling overheads may be reduced. Alternatively, the time domain position of the first time interval in the time window and the time domain position of the second time interval in the time window are predefined. A specific manner of predefining or preconfiguring the time domain position of the first time interval in the time window or the time domain position of the second time interval in the time window is not limited in this application.

Figure 5:
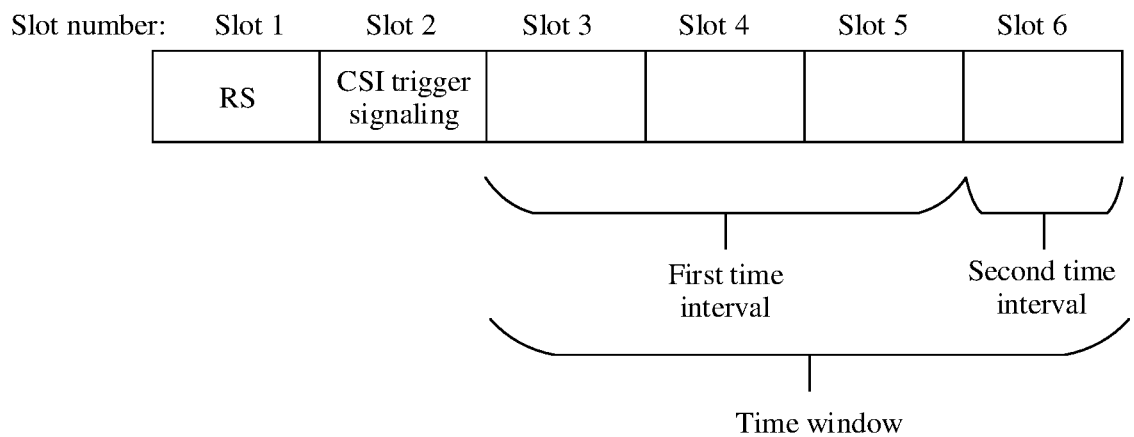
FIG. 5 is a schematic diagram of a time window, a first time interval, and a second time interval according to some embodiments of this application.

For example, FIG. 5 is a schematic diagram of a time window, a first time interval, and a second time interval according to an embodiment of this application. As shown in FIG. 5, the time window is a slot 3 to a slot 6. The first time interval is three slots (the slot 3 to the slot 5), and the second time interval is one slot (the slot 6). The first terminal device sends an RS to the second terminal device in a slot 1, and the first terminal device sends CSI trigger information (signaling) to the second terminal device in a slot 2. The CSI trigger information (signaling) may be used as a timing start time point of the first time interval, and timing of the first time interval starts from the slot 3. If the second terminal device has, in the slot 3 to the slot 5, data that is to be sent to the first terminal device, both CSI and the data are carried on a PSSCH and sent to the first terminal device. If the second terminal device does not have, in the slot 3 to the slot 5, data that is to be sent to the first terminal device, the second terminal device sends, in the slot 6, only CSI to the first terminal device by including the CSI in a PSSCH.

Figure 6:
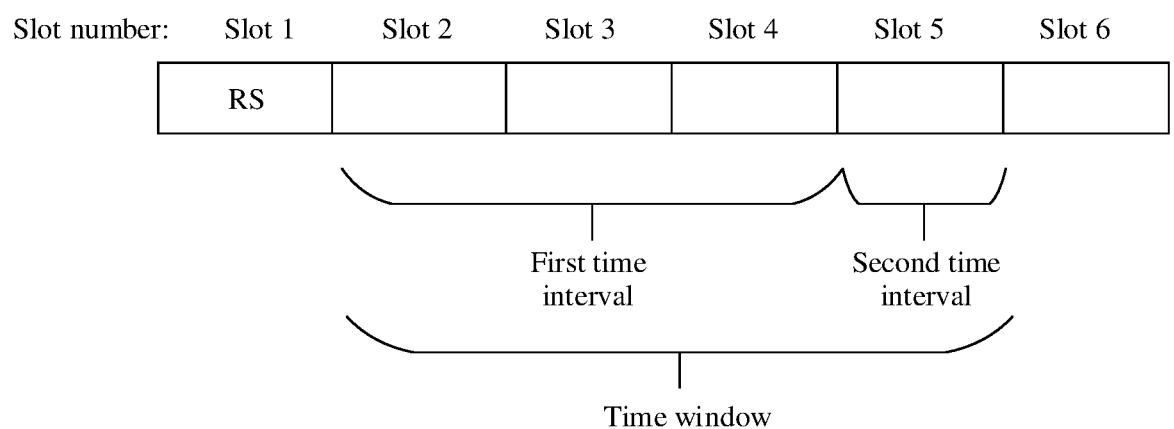
FIG. 6 is a schematic diagram of a time window, a first time interval, and a second time interval according to some other embodiments of this application.

For another example, FIG. 6 is a schematic diagram of a first time interval and a second time interval according to another embodiment of this application. As shown in FIG. 6, a time window is a slot 3 to a slot 5. The first time interval is three slots (a slot 2 to the slot 4), and the second time interval is one slot (the slot 5). The first terminal device sends an RS to the second terminal device in a slot 1. A sending time point of the RS may be used as a timing start time point of the first time interval, and timing of the first time interval starts from the slot 2. If the second terminal device has, in the slot 2 to the slot 4, data that is to be sent to the first terminal device, both CSI and the data are carried on a PSSCH and sent to the first terminal device. If the second terminal device does not have, in the slot 2 to the slot 4, data that is to be sent to the first terminal device, the second terminal device sends, in the slot 5, only CSI to the first terminal device by including the CSI in a PSSCH.

It should be understood that FIG. 5 and FIG. 6 are merely examples, and should not constitute any limitation on the time window, the first time interval, and the second time interval in this embodiment of this application.

In this embodiment of this application, the PSSCH used to send only the CSI in the second time interval may also be referred to as a CSI only PSSCH. In the first communication mode, when indicating a resource of data, a network device may configure a resource used only for the CSI. The first terminal device indicates, to the second terminal device by using the SCI, the resource used to transmit only the CSI. In addition to a manner of explicitly indicating the resource used to transmit only the CSI, an implicit association manner may also be used. For example, the network device configures the valid time period (the sum of the time length of the first time interval and the time length of the second time interval) and a time-frequency resource for transmitting the data, and the second terminal device may implicitly associate, based on the PSSCH time-frequency resource, the resource used to transmit only the CSI. For example, a specific implicit association rule may be: The second terminal device determines, based on a slot in which the PSSCH time-frequency resource is located, a position of an occupied subchannel, and identification information of the first terminal device, the resource used only for the CSI. For example, the resource used to transmit the CSI is determined based on a lowest or highest index of a subchannel used by the PSSCH in frequency domain and two symbols in time domain. The PSSCH may be understood as a shared channel carrying the data sent by the first terminal device to the second terminal device. In the second communication mode, the first terminal device may reserve, in advance, a resource used to transmit only the CSI, and indicate the resource to the second terminal device by using the SCI. Alternatively, the second terminal device determines, in the implicit association manner and based on a PSSCH time-frequency resource, the resource used to transmit only the CSI. Alternatively, after receiving the CSI trigger information (signaling), the second terminal device may independently select, based on the valid time period, the resource used to transmit only the CSI.

Figure 7:
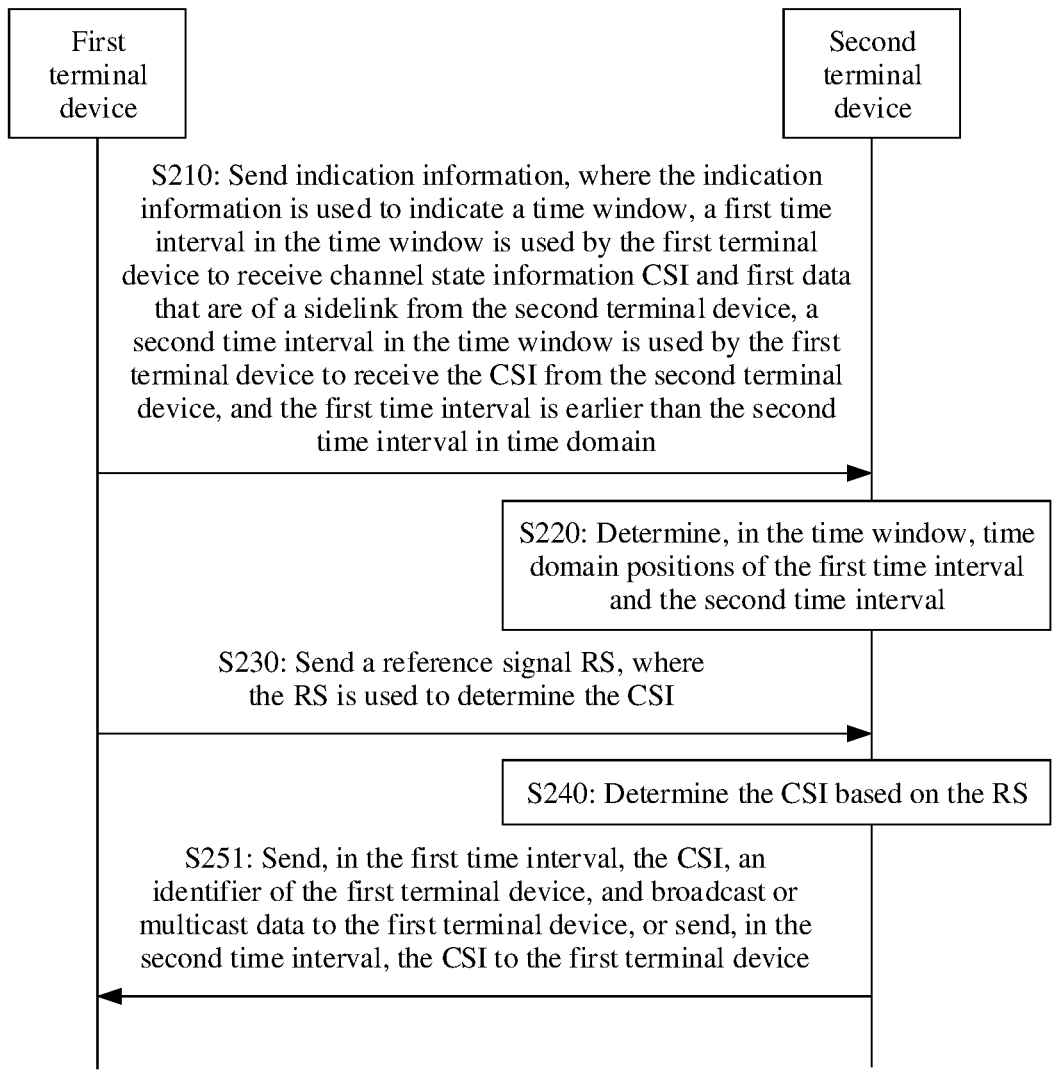
FIG. 7 is a schematic interaction diagram of another sidelink channel state information transmission method according to an embodiment of this application.

In some embodiments of this application, in S250, when the first data sent by the second terminal device to the first terminal device in the first time interval is unicast data, the second terminal device may send, to the first terminal device, the CSI together with the unicast data when sending the unicast data. If the second terminal device has, in the first time interval, no unicast data but only multicast or broadcast data, FIG. 7 is used as an example. On a basis of the steps of the method shown in FIG. 4, S250 in the method 200: The second terminal device sends, in the first time interval, the CSI and the first data to the first terminal device, or sends, in the second time interval, the CSI to the first terminal device includes S251.

S251: The second terminal device sends, in the first time interval, the CSI, an identifier of the first terminal device, and the broadcast data or the multicast data to the first terminal device, or sends, in the second time interval, the CSI to the first terminal device.

For descriptions of S210 to S240 shown in FIG. 7, refer to the foregoing descriptions of S210 to S240. For brevity, details are not described herein again.

In S251, in the first time interval, when the second terminal device has the multicast or broadcast data that is to be sent to the first terminal device, because the multicast or broadcast data can be received by a plurality of terminal devices, but the CSI is sent only to the first terminal device, identification information of the first terminal device, for example, a destination identifier (destination ID), needs to be added to the CSI report, so that the first terminal device correctly receives the CSI. Therefore, the second terminal device may send the identifier of the first terminal device, the broadcast data or the multicast data, and the CSI to the first terminal device by using the PSSCH. The identifier of the first terminal device is used to identify the first terminal device. After identifying the identifier of the first terminal device, the first terminal device may determine that the CSI is sent to the first terminal device, so that the first terminal device correctly receives the CSI. Therefore, effective transmission of the CSI carried together with the multicast or broadcast data is ensured, and reliability of CSI transmission is improved. For example, the second terminal device may send both the CSI and the data to the first terminal device by including the CSI in a medium access control (MAC) control element (CE), and include the identification information of the first terminal device in the CSI.

In some embodiments of this application, the CSI includes a channel quality indicator CQI value corresponding to the sidelink, or the CSI includes a CQI table corresponding to the sidelink and a CQI value in the CQI table.

Specifically, in a V2X communication system, the first terminal device and the second terminal device may not be in coverage of the network device. In this case, the network device cannot configure the CQI table for the first terminal device and the second terminal device. Alternatively, even if the first terminal device and the second terminal device are in the coverage of the network device, and the network device can configure the CQI table by using RRC signaling, a prerequisite for this manner to be effective is that the first terminal device or the second terminal device reports the CSI measurement report of the sidelink between the first terminal device and the second terminal device to the network device, and the network device configures, based on the CSI measurement result, an MCS table and an MCS for a to-be-transmitted data packet (in a next transmission). Because the first terminal device and the second terminal device are affected by the moving speeds, a change periodicity of the quality of the sidelink between the first terminal device and the second terminal device may be relatively short. An effect of configuring the CQI table by the network device deteriorates. Therefore, the second terminal device may first determine the CQI table corresponding to the sidelink, and then determine the CQI value in the CQI table. In addition, the CQI value, or the CQI table and the CQI value in the CQI table is/are carried in the CSI and fed back to the first terminal device. In this way, the CSI fed back by the second terminal device to the first terminal device may be more efficient, and accuracy and reliability of the CSI may be improved. This helps the first terminal device select proper MCS parameters (for example, a modulation order and a code rate) based on the CSI, to send data to the second terminal device. This improves reliability of sending the data by the first terminal device to the second terminal device and improves a spectral efficiency.

It should be understood that in this embodiment of this application, in addition to the CQI value, or the CQI table and the CQI value in the CQI table, the CSI may further include an RI corresponding to the sidelink, and the like. This is not limited herein in this application.

Figure 8:
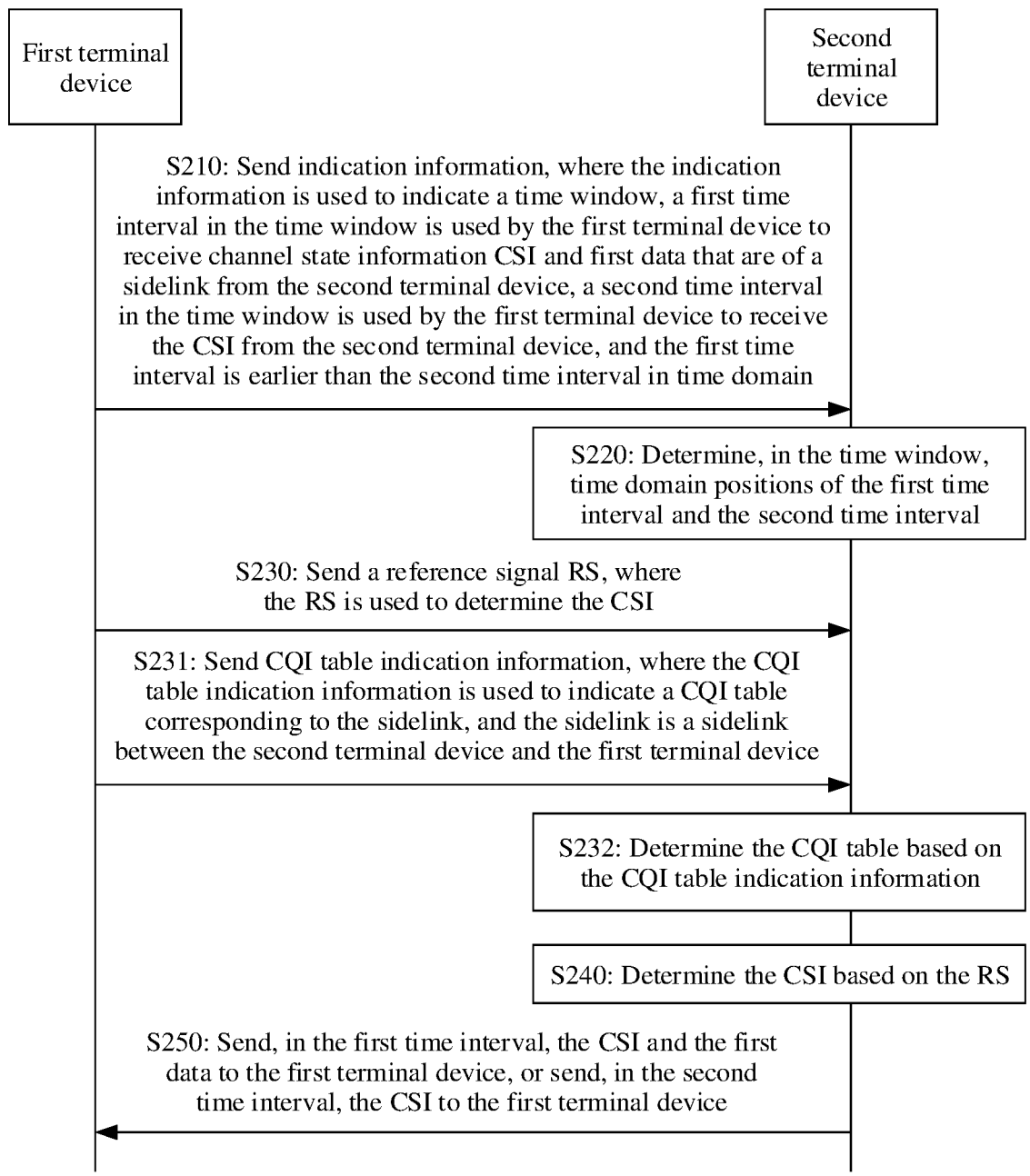
FIG. 8 is a schematic interaction diagram of another sidelink channel state information transmission method according to an embodiment of this application.

In a process in which the second terminal device determines the CQI table corresponding to the sidelink, the first terminal device may first indicate the CQI table corresponding to the sidelink to the second terminal device, and the second terminal device may determine the CQI table based on an indication of the first terminal device. A row in the CQI table is further determined. A row in the CQI table may include parameters such as a CQI index, a modulation scheme (modulation), a code rate, and an efficiency. The terminal device reports the row of parameters (a CQI value) to the first terminal device by using the CSI. In this case, the CSI may include the CQI value but not include the CQI table. FIG. 8 is used as an example. On the basis of the steps of the method shown in FIG. 4, the method 200 further includes S231 and S232.

S231: The first terminal device sends CQI table indication information to the second terminal device. The CQI table indication information indicates a CQI table corresponding to the sidelink, and the sidelink is a sidelink between the second terminal device and the first terminal device. Correspondingly, the second terminal device receives the CQI table indication information.

S232: The second terminal device determines the CQI table based on the CQI table indication information.

For descriptions of S210, S220, S230, S240, and S250 shown in FIG. 8, refer to the foregoing descriptions of S210, S220, S230, S240, and S250. For brevity, details are not described herein again.

In S231, the first terminal device may generate the CQI table indication information, where the CQI table indication information indicates the CQI table corresponding to the sidelink. For example, it is assumed that there are a total of three CQI tables in V2X communication: two tables with a maximum modulation order of 64QAM and one table with a maximum modulation order of 256QAM.

The two tables with the maximum modulation order of 64QAM are separately shown in a CQI table 1 and a CQI table 2.

| CQI table 1 | | | |
|---|---|---|---|
| CQI index | Modulation | Code rate | Efficiency |
| 0 | Out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3233 |
| 12 | 64QAM | 666 | 3.9023 |
| 13 | 64QAM | 772 | 6.2266 |
| 14 | 64QAM | 873 | 6.9141 |
| 15 | 64QAM | 948 | 7.4063 |

| CQI table 2 | | | |
|---|---|---|---|
| CQI index | Modulation | Code rate | Efficiency |
| 0 | Out of range | | |
| 1 | QPSK | 30 | 0.0586 |
| 2 | QPSK | 50 | 0.0977 |
| 3 | QPSK | 78 | 0.1532 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

The table with the maximum modulation order of 256QAM is shown in a CQI table 3.

CQI table 3

| CQI index | Modulation | Code rate | Efficiency |
|---|---|---|---|
| 0 | | Out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 626 | 2.4063 |
| 7 | 16QAM | 466 | 2.7305 |
| 8 | 16QAM | 567 | 3.3223 |
| 9 | 16QAM | 666 | 3.9023 |
| 10 | 16QAM | 772 | 4.5234 |
| 11 | 16QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

In S231, the CQI table indication information may indicate any one of the three CQI tables. In S232, the second terminal device may determine, based on the CQI table indication information, the CQI table indicated by the CQI table indication information. Further, through a CSI measurement process, a row of parameters in the CQI table is determined, and the row of parameters (a CQI value) is reported to the first terminal device by using the CSI. In this way, a configuration manner of the CQI table may be more flexible, the CSI fed back by the second terminal device to the first terminal device may be more efficient, and the accuracy of the CSI may be improved.

In S231, in a possible implementation, the CQI table indication information may include a field that indicates the CQI table and that is added to control signaling (for example, first SCI). In other words, an explicit manner indicates the CQI table to the second terminal device.

In another possible implementation, the CQI table indication information includes an implicitly indicated field in the control signaling. For example, the CQI table indication information includes a priority and/or a quality of service corresponding to data sent by the first terminal device to the second terminal device. In other words, the CQI table indication information may implicitly indicate the CQI table by using the priority and/or the quality of service corresponding to the sidelink data sent by the first terminal device to the second terminal device.

For a method in which the CQI table indication information implicitly indicates the CQI table by using the priority and/or the quality of service corresponding to the sidelink data, in a possible implementation, the first terminal device sends the sidelink data to the second terminal device, and the second terminal device determines the CQI table based on the priority and/or the quality of service corresponding to the sidelink data. In other words, after determining the priority and/or the quality of service of the received sidelink data, the second terminal device determines the CQI table based on an association relationship between a priority and/or a quality of service of data and a CQI table.

In another possible implementation, the priority and/or the quality of service corresponding to the sidelink data may be indicated by using an indication field in sidelink control information (the first SCI) sent by the first terminal device to the second terminal device. In other words, the indication field in the first SCI indicates the CQI table to the second terminal device. The first SCI is used to schedule the sidelink data.

In a possible implementation, the indication field in the first SCI may be a reserved field in the first SCI or a newly added indication field in the first SCI, and indicates the CQI table.

In another possible implementation, the indication field in the first SCI is a priority field and/or a quality of service (QoS) indication field, and the priority field or the quality of service indication field in the first SCI indicates the priority and/or the quality of service corresponding to the data scheduled by using the SCI. In other words, the priority field or the quality of service indication field in the first SCI indicates the CQI table.

Specifically, the priority field and/or the quality of service indication field in the first SCI may indicate a reliability requirement of the data sent by the first terminal device to the second terminal device, that is, may be used as an element for determining the CQI table. It is assumed that there are two CQI tables (for example, the CQI table 1 and the CQI table 2) with a maximum modulation order of 64QAM in V2X, where the CQI tables correspond to different efficiencies. There are eight levels of priorities indicated by the priority field or the quality of service indication field in the first SCI, where values of the priorities are sequentially 1, 2, 3, 4, 5, 6, 7, and 8, and a smaller value indicates a higher priority/quality of service requirement.

The priorities may be divided into two groups based on priority/quality of service requirements. For example, {1, 2, 3, 4} is a group, and {5, 6, 7, 8} is a group. Because reliability of the group {1, 2, 3, 4} is higher than that of the group {5, 6, 7, 8}, the group {1, 2, 3, 4} is associated with a CQI table (for example, the CQI table 2) with a lower efficiency, and the group {5, 6, 7, 8} is associated with a CQI table (for example, the CQI table 1) with a higher efficiency. Because a higher efficiency indicates a lower modulation order and higher data transmission reliability but a lower spectral efficiency, data with a higher priority/quality of service requirement should correspond to a CQI table with a lower efficiency. Values of efficiencies of different CQI tables may be distinguished by comparing efficiencies indicated by a same CQI index in the CQI tables. The second terminal device may determine the CQI table based on the priority field or the quality of service indication field in the first SCI.

For another example, it is assumed that there are two CQI tables (corresponding to different efficiencies) with a maximum modulation order of 64QAM and one CQI table with a maximum modulation order of 256QAM in V2X, for example, the CQI table 1, the CQI table 2, and the CQI table 3. There are eight levels indicated by the priority field or the quality of service indication field in the first SCI, where sequence numbers are sequentially 1, 2, 3, 4, 5, 6, 7, and 8. In this case, there may be the following correspondences:

{1, 2, 3, 4} corresponds to a table (for example, the CQI table 2) with a lower efficiency in the CQI tables with the maximum modulation order of 64QAM, and {5, 6, 7, 8} corresponds to a table (for example, the CQI table 1) with a higher efficiency in the CQI tables with the maximum modulation order of 64QAM.

Alternatively, {1, 2, 3} corresponds to a CQI table (for example, the CQI table 2) with a lower efficiency in the CQI tables with the maximum modulation order of 64QAM, {4, 5, 6} corresponds to a CQI table (for example, the CQI table 1) with a higher efficiency in the CQI tables with the maximum modulation order of 64QAM, and {7, 8} corresponds to a CQI table (for example, the CQI table 3) with the maximum modulation order of 256QAM.

It should be understood that the foregoing specific process in which the priority field or the quality of service indication field in the first SCI indicates the CQI table is merely an example, and should not constitute any limitation on a specific implementation in which the priority field or the quality of service indication field in the first SCI indicates the CQI table.

Because both the first terminal device and the second terminal device may learn of content indicated by the priority field or the quality of service indication field in the first SCI, both the first terminal device and the second terminal device may learn of the CQI table corresponding to the priority field or the quality of service indication field in the first SCI. Therefore, the priority field and/or the quality of service indication field in the first SCI may be used to indicate the CQI table. When the CQI table is accurately indicated, signaling overheads may be reduced, and communication efficiency may be improved.

When the first terminal device indicates a CQI table to the second terminal device, the CSI may include a CQI value but not include the CQI table.

When the first terminal device or the network device does not indicate a CQI table to the second terminal device, the second terminal device may independently determine a CQI table. In addition, one or more combinations of a CQI table and a CQI value in the CQI table may be carried in the CSI. This helps improve the accuracy of the CSI, and helps the first terminal device select a proper modulation parameter, a proper code rate, and the like based on the CSI, to send data to the second terminal device.

In an implementation, for example, it is assumed that there are only two CQI tables with a maximum modulation order of 64QAM in V2X, or the second terminal device does not support a modulation order of 256QAM. The first terminal device or the network device may not indicate CQI table information to the second terminal device. In this case, the second terminal device may determine the two CQI tables, and separately determine CQI values in the two CQI tables. The second terminal device may indicate, by using one bit in the CSI, a CQI table that corresponds to a reported CQI value and that is in the two CQI tables with the maximum modulation order of 64QAM. In other words, the CSI may carry one combination of CQI table indication information and a CQI value in the CQI table.

For another example, it is assumed that there are only one table with a maximum modulation order of 64QAM and one CQI table with a maximum modulation order of 256QAM in V2X. In this case, the second terminal device may indicate, by using one bit in the CSI, a CQI table corresponding to a reported CQI value. In other words, the CSI may carry one combination of CQI table indication information and a CQI in the CQI table.

For another example, it is assumed that there are two tables with a maximum modulation order of 64QAM and one CQI table with a maximum modulation order of 256QAM in V2X. In this case, the second terminal device may indicate, by using two bits in the CSI, a CQI table that corresponds to a reported CQI value and that is in the three CQI tables. In other words, the CSI may carry one combination of CQI table indication information and a CQI in the CQI table.

In another implementation, when the second terminal device determines a plurality of CQI tables, the second terminal device may determine one CQI value in each CQI table. Then, CQI values corresponding to the plurality of CQI tables are fed back to the first terminal device by using the CSI. In other words, the CSI may carry a plurality of combinations of a CQI table and a CQI value in the CQI table. For example, it is assumed that there are two CQI tables (for example, the CQI table 1 and the CQI table 2) with a maximum modulation order of 64QAM. In this case, when the second terminal device feeds back the CSI, two groups of values, that is, a CQI value 1 and the CQI table 1, and a CQI value 2 and the CQI table 2, may be carried in the CSI. The first terminal device may select a most proper MCS table and MCS parameter based on the plurality of combinations of a CQI value and a CQI table provided by the second terminal device and a reliability/priority/quality of service requirement of next service scheduling, to achieve a highest spectral efficiency.

According to the sidelink channel state information transmission method provided in this application, the second terminal device feeds back the CQI value to the first terminal device by using the CSI, or feeds back the CQI table and the CQI value in the CQI table to the first terminal device by using the CSI. In this way, the CSI fed back by the second terminal device to the first terminal device may be more efficient, and accuracy of the CSI feedback may be improved. This helps the first terminal device select a proper MCS parameter based on the CSI, to send data to the second terminal device. This improves reliability of sending the data by the first terminal device to the second terminal device.

It should be understood that the steps shown in FIG. 7 may also include S231 and S232.

It should be further understood that, the first terminal device sends the RS to the second terminal device and triggers the second terminal device to report the CSI, and the second terminal device performs CSI measurement. It is assumed that channel reciprocity is supported, that is, a channel status of the sidelink on which the first terminal device sends data to the second terminal device and a channel status of the sidelink on which the second terminal device sends data to the first terminal device may be considered similar. In this case, the second terminal device may determine, based on the CSI (including the CQI and the RI), a modulation order and a target code rate used for data sending, send data to the first terminal device by using the determined modulation order and the determined target code rate, and include the CSI in the data.

In some embodiments of this application, when the second terminal device feeds back the CSI to the first terminal device, in addition to sending the CSI together with the data to the first terminal device, the CSI may alternatively be carried in SCI (second SCI) sent by the second terminal device to the first terminal device. For example, the second SCI may be used to schedule the data sent by the second terminal device to the first terminal device.

In a possible implementation, the second terminal device may add a CSI field to the second SCI to carry the CSI.

In another possible implementation, the second terminal device may use a reserved bit in the second SCI to carry the CSI or the compressed CSI. The reserved bit may be understood as follows: Lengths of some fields in the SCI are changeable, but a length of a specific SCI format is fixed. Therefore, there are some reserved bits. However, lengths of the reserved bits cannot be determined. For example, it is assumed that the CQI in the CSI occupies four bits, and a quantity of available reserved bits is three. In this case, the CQI table with 16 rows is divided into eight groups, where every two adjacent rows are a group, and the three bits indicate one of the eight groups. It is assumed that a quantity of available reserved bits is two. In this case, the CQI table with 16 rows is divided into four groups, where every four adjacent rows are a group, and the two bits indicate one of the four groups.

In another possible implementation, the second terminal device may alternatively use second SCI used only to transmit the CSI to carry the CSI. That is, a format of the second SCI is specific, and the SCI of this format includes only the CSI.

It should be understood that the foregoing several manners are merely several examples in which the second terminal device sends the CSI to the first terminal device by using the second SCI. In this embodiment of this application, the second terminal device may alternatively send the CSI to the first terminal device by including the CSI in the second SCI in another manner. This is not limited in this embodiment of this application.

According to the sidelink channel state information transmission method provided in this application, the CSI sent by the second terminal device to the first terminal device is carried in the SCI sent by the second terminal device to the first terminal device, so that the reliability of the CSI transmission may be ensured.

In some embodiments of this application, after receiving the CSI fed back by the second terminal device, the first terminal device uses, as references for subsequent downlink scheduling, the CQI value and an RI value that are included in the CSI, or the CQI table, the CQI value in the CQI table, and an RI value that are included in the CSI. To be specific, the first terminal device determines, based on the CQI value and the RI value, or based on the CQI table, the CQI value in the CQI table, and the RI value, an MCS table used to send data to the second terminal device, and determines corresponding MCS parameters (for example, a modulation order and a target code rate) in the MCS table. When the second terminal device is not in the coverage of the network device, the first terminal device needs to indicate the MCS table to the second terminal device, so that the second terminal device determines, based on the MCS table and a row of MCS parameters (for example, an MCS index) indicated by the first terminal device, an MCS parameter used to receive the data of the first terminal device, to improve reliability of determining the MCS table by the second terminal device.

Figure 9:
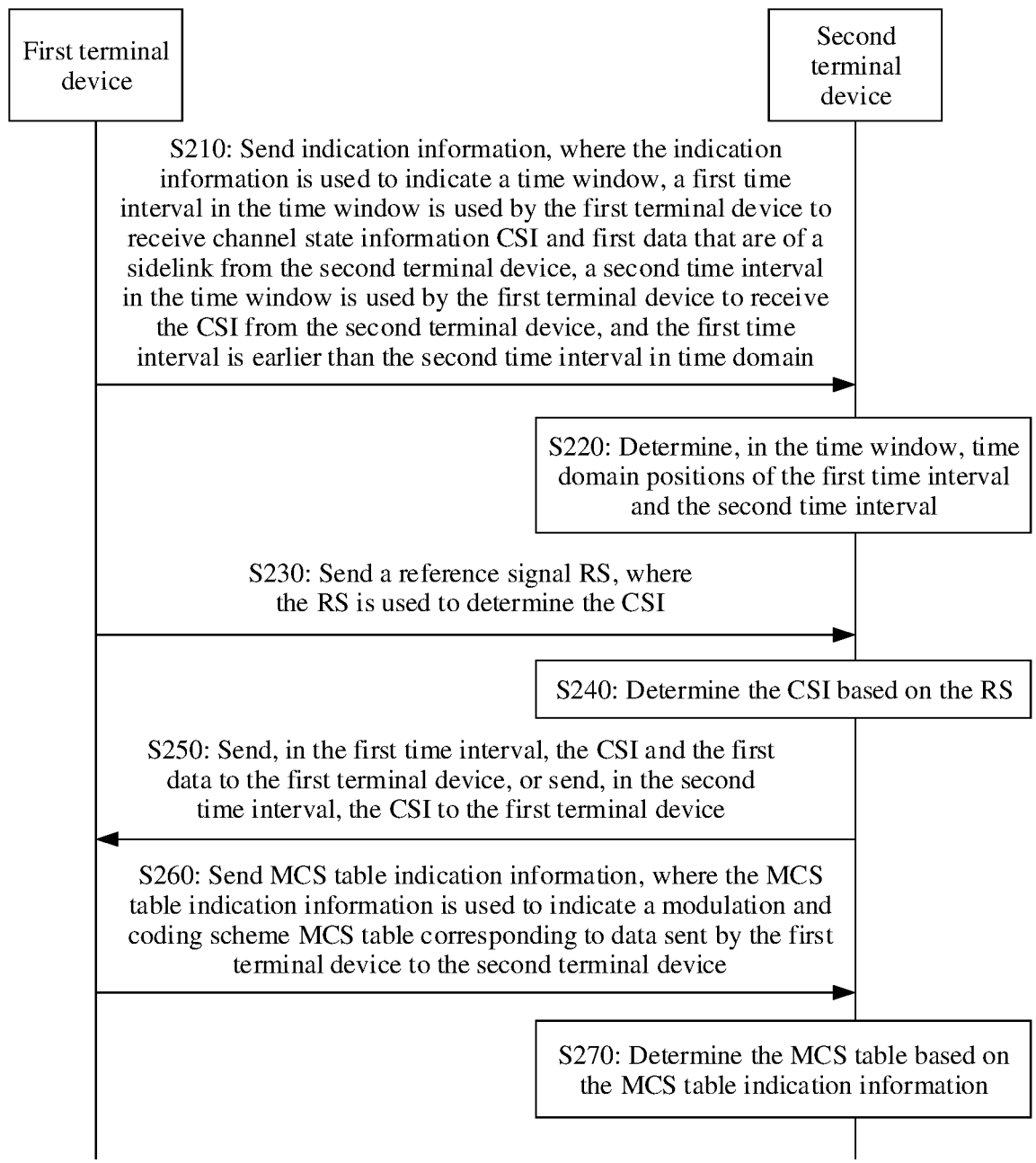
FIG. 9 is a schematic interaction diagram of another sidelink channel state information transmission method according to an embodiment of this application.

FIG. 9 is used as an example. On the basis of the steps of the method shown in FIG. 4, the method 200 further includes S260 and S270.

S260: The first terminal device sends MCS table indication information to the second terminal device, where the MCS table indication information indicates a modulation and coding scheme MCS table corresponding to data sent by the first terminal device to the second terminal device. Correspondingly, the second terminal device receives the MCS table indication information.

S270: The second terminal device determines the MCS table based on the MCS table indication information.

For descriptions of S210, S220, S230, S240, and S250 shown in FIG. 9, refer to the foregoing descriptions of S210, S220, S230, S240, and S250. For brevity, details are not described herein again.

In S260, the first terminal device may send the MCS table indication information, where the MCS table indication information indicates the MCS table corresponding to the data sent by the first terminal device to the second terminal device. For example, it is assumed that there are a total of three MCS tables in V2X: two MCS tables with a maximum modulation order of 64QAM, and one MCS table with a maximum modulation order of 256QAM.

The two MCS tables with the maximum modulation order of 64QAM are separately shown in an MCS table 1 and an MCS table 2.

| MCS table 1 | | | |
| --- | --- | --- | --- |
| MCS index | Modulation order ($Q_m$) | Target code rate | Spectral efficiency |
| 0 | 2 | 120 | 0.2344 |
| 1 | 2 | 157 | 0.3066 |
| 2 | 2 | 193 | 0.3770 |
| 3 | 2 | 251 | 0.4092 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8161 |
| 26 | 6 | 873 | 5.1152 |
| 27 | 6 | 910 | 5.3320 |
| 28 | 6 | 948 | 5.5547 |
| 29 | 2 | | Reserved |
| 30 | 4 | | Reserved |
| 31 | 6 | | Reserved |

| MCS table 2 | | | |
| --- | --- | --- | --- |
| MCS index | Modulation order ($Q_m$) | Target code rate | Spectral efficiency |
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | | Reserved |

-continued

MCS table 2

| MCS index | Modulation order ($Q_m$) | Target code rate | Spectral efficiency |
|---|---|---|---|
| 30 | 4 | | Reserved |
| 31 | 6 | | Reserved |

The MCS table with the maximum modulation order of 64QAM is shown in an MCS table 3.

MCS table 3

| MCS index | Modulation order ($Q_m$) | Target code rate | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 2 | 378 | 1.4766 |
| 6 | 2 | 434 | 1.6953 |
| 7 | 2 | 490 | 1.9141 |
| 8 | 2 | 553 | 2.1602 |
| 9 | 2 | 616 | 2.4063 |
| 10 | 4 | 658 | 2.5703 |
| 11 | 4 | 466 | 2.7305 |
| 12 | 4 | 517 | 3.0293 |
| 13 | 4 | 567 | 3.3223 |
| 14 | 2 | 616 | 3.6094 |
| 15 | 4 | 666 | 3.9023 |
| 16 | 4 | 719 | 4.2129 |
| 17 | 6 | 772 | 4.5234 |
| 18 | 6 | 822 | 4.81.64 |
| 19 | 6 | 873 | 5.1152 |
| 20 | 6 | 682.5 | 5.3320 |
| 21 | 6 | 711 | 5.5547 |
| 22 | 6 | 754 | 5.8906 |
| 23 | 6 | 797 | 6.2266 |
| 24 | 6 | 841 | 6.5703 |
| 25 | 6 | 885 | 6.9141 |
| 26 | 6 | 916.5 | 7.1602 |
| 27 | 6 | 948 | 7.4063 |
| 28 | 6 | | Reserved |
| 29 | 2 | | Reserved |
| 30 | 4 | | Reserved |
| 31 | 6 | | Reserved |

It should be understood that the foregoing three MCS tables are merely examples. In this embodiment of this application, there may be a plurality of MCS tables that may be used in V2X. There may be one or more MCS tables with a maximum modulation order of 64QAM, where a plurality of MCS tables with a maximum modulation order of 64QAM have different spectral efficiencies, that is, a same index in the MCS tables corresponds to different spectral efficiencies. Similarly, there may be one or more MCS tables with a maximum modulation order of 256QAM, where a plurality of MCS tables with a maximum modulation order of 256QAM have different spectral efficiencies, that is, a same index in the MCS tables corresponds to different spectral efficiencies. A total quantity of MCS tables is, for example, five or eight. This is not limited in this embodiment of this application.

In S260, the MCS table indication information may indicate any one of a plurality of MCS tables. The first terminal device may send the MCS table indication information to the second terminal device. In S270, the second terminal device determines the MCS table based on the MCS table indication information. Further, with reference to other information, for example, an MCS index indicated by the first terminal device in SCI, an MCS parameter used to receive the data sent by the first terminal device is determined. This improves efficiency and reliability of determining the MCS table by the second terminal device. Further, the second terminal device accurately receives the data sent by the first terminal device. This improves reliability of data transmission.

In a possible implementation, the MCS table indication information includes an indication field in the first SCI, and the indication field in the first SCI indicates the MCS table.

Optionally, the indication field in the first SCI may be a reserved field in the first SCI or a newly added indication field. For example, it is assumed that there are two MCS tables in V2X communication. In this case, one bit needs to be added in the first SCI to indicate one of the two MCS tables. It is assumed that there are three MCS tables in V2X communication. In this case, two bits need to be added in the first SCI to indicate one of the three MCS tables.

Optionally, the indication field in the first SCI may alternatively be a field originally included in the first SCI. For example, the indication field may be a priority field and/or a quality of service indication field in the first SCI, and the priority field or the quality of service indication field in the first SCI indicates a priority and/or a quality of service corresponding to the data. In other words, the priority field or the quality of service indication field in the first SCI indicates the MCS table. This is because priorities and/or qualities of service of data indicate different reliability or priority requirements, and may be associated with maximum modulation orders and spectral efficiencies, that is, different priorities/qualities of service are associated with MCS tables with different maximum modulation orders and different spectral efficiencies.

For example, it is assumed that there are two MCS tables in V2X communication. The two MCS tables are separately the MCS table 1 and the MCS table 2. A spectral efficiency of the MCS table 1 is higher. To be specific, for a same index, a spectral efficiency value in the MCS table 1 is higher, that is, a spectral efficiency of the MCS table 1 is higher. In this case, a service with a higher priority and/or higher reliability uses the MCS table 2 with a lower spectral efficiency, and a service with a lower priority and/or lower reliability uses the MCS table 1 with the higher efficiency. A value of reliability of a service may be indicated by the priority field and/or the quality of service indication field in the first SCI. It is assumed that there are eight values indicated by the priority field and/or the quality of service indication field, and the values are sequentially 1, 2, 3, 4, 5, 6, 7, and 8. A smaller value indicates a higher priority/reliability/quality of service requirement. In this case, the value 1, 2, 3, or 4 indicated by the priority field and/or the quality of service indication field corresponds to the MCS table 2; and the value 5, 6, 7, or 8 indicated by the priority field and/or the quality of service indication field corresponds to the MCS table 1.

For another example, it is assumed that there are three MCS tables in V2X communication. The three MCS tables include two MCS tables (for example, the MCS table 1 and the MCS table 2) with a maximum modulation order of 64QAM and one MCS table (the MCS table 3) with a maximum modulation order of 256QAM. In this case, the value 1, 2, or 3 indicated by the priority field and/or the quality of service indication field corresponds to the MCS table 2; the value 4, 5, or 6 indicated by the priority field and/or the quality of service indication field corresponds to the MCS table 1; and the value 7 or 8 indicated by the priority field and/or the quality of service indication field corresponds to the MCS table 3. If a channel quality fed back by using the CSI is relatively high, the first terminal device sends the data by using an MCS table with a maximum modulation order of 256QAM or by using a modulation order and a code rate that correspond to an MCS value with a relatively large index in an MCS table with a maximum modulation order of 64QAM, so that a spectral efficiency can be improved.

The priority field and/or the quality of service indication field in the SCI are/indicates the MCS table. Therefore, when the MCS table is accurately indicated, signaling overheads may be reduced, communication efficiency may be improved, and configuration flexibility of the first terminal device may be provided.

In a possible implementation, the first terminal device may alternatively include the MCS table indication information in RRC signaling, MAC signaling, a master information block (MIB), a system information block (SIB), or broadcast channel information. For example, a second indication field may be added to the MAC information, the SIB, the MIB, or the broadcast channel information, where the second indication field indicates the MCS table.

In another possible implementation, the first terminal device may alternatively indicate the MCS table to the second terminal device by sending a cyclic redundancy check (CRC) mask type of the first SCI and/or a CRC mask type corresponding to the data to the second terminal device. In other words, the MCS table indication information includes the CRC mask type of the first SCI and/or the CRC mask type corresponding to the data. Mask types of CRC scrambling may indicate different priority and/or reliability requirements, and a CRC mask type of SCI and/or data with a higher priority may be associated with an MCS table with a higher spectral efficiency or an MCS table with a maximum modulation order of 64QAM.

In another possible implementation, the first terminal device may alternatively indicate the MCS table to the second terminal device by sending a service type corresponding to the data to the second terminal device. In other words, the MCS table indication information includes the service type corresponding to the data. The service type includes a broadcast/multicast/unicast service type. For example, a broadcast and multicast service may use a preconfigured modulation order and code rate. The service type may also include an aperiodic/periodic service type. An MCS table may be dynamically configured for data transmission of an aperiodic service, and an MCS table may be semi-statically or periodically configured for data transmission of a periodic service.

Specifically, the service type corresponding to the data may include periodic service data and aperiodic service data. The second terminal device may determine the MCS table based on one or more of the service type of the data, the CRC mask type of the first SCI and/or the CRC mask type of the data, the priority and/or the quality of service of the data, a type of the reference signal, and a symbol length or density of the reference signal. Further, the first terminal device indicates an MCS index by using an MCS field in the SCI. The second terminal device performs matching with a corresponding MCS index in the MCS table based on the MCS index indicated by the MCS field, to determine an MCS parameter used to parse the data.

In another possible implementation, the MCS table indication information includes a format (format) of the first SCI, and the terminal device indicates the MCS table to the second terminal device based on the format corresponding to the first SCI. Different SCI formats (format) correspond to different MCS tables. That the first terminal device sends SCI of different formats to the second terminal device means that different MCS tables are indicated to the second terminal device. For example, the format of the first SCI is used to schedule data with a relatively high priority/relatively high reliability/a relatively high quality of service. In this case, an MCS table corresponding to the data scheduled by the SCI format may be an MCS table with a relatively low spectral efficiency or an MCS table with a maximum modulation order of 64QAM.

In another possible implementation, an MCS table is associated with a resource pool, the MCS table indication information may include an identifier of a resource pool for sending the data by the first terminal device to the second terminal device, and there is a correspondence between the resource pool and the MCS table. In other words, different resource pools are associated with different MCS tables. For example, there are two MCS tables with a maximum modulation order of 64QAM in V2X, where the MCS tables are separately referred to as an MCS table 1 and an MCS table 2, the MCS table 1 is associated with a resource pool 1, and the MCS table 2 is associated with a resource pool 2. In this case, the first terminal device may select a corresponding MCS table and a corresponding resource pool based on the priority/quality of service of the to-be-sent data, and the second terminal device determines the associated MCS table based on the resource pool for receiving the data. In a possible implementation, the resource pool may be a resource set. The first terminal device sends the data in the resource set, and the second terminal device receives the data in the resource set.

It should be understood that the steps shown in FIG. 7 and FIG. 8 may also include S260 and S270.

According to the sidelink channel state information transmission method provided in this application, in a V2X communication system, even if the first terminal device and the second terminal device are not in coverage of a network device, the first terminal device sends the MCS table indication information to the second terminal device, so that the second terminal device can still accurately determine the MCS table and further determine the MCS parameter in the MCS table. This improves the efficiency and the reliability of determining the MCS table by the second terminal device.

Figure 10:
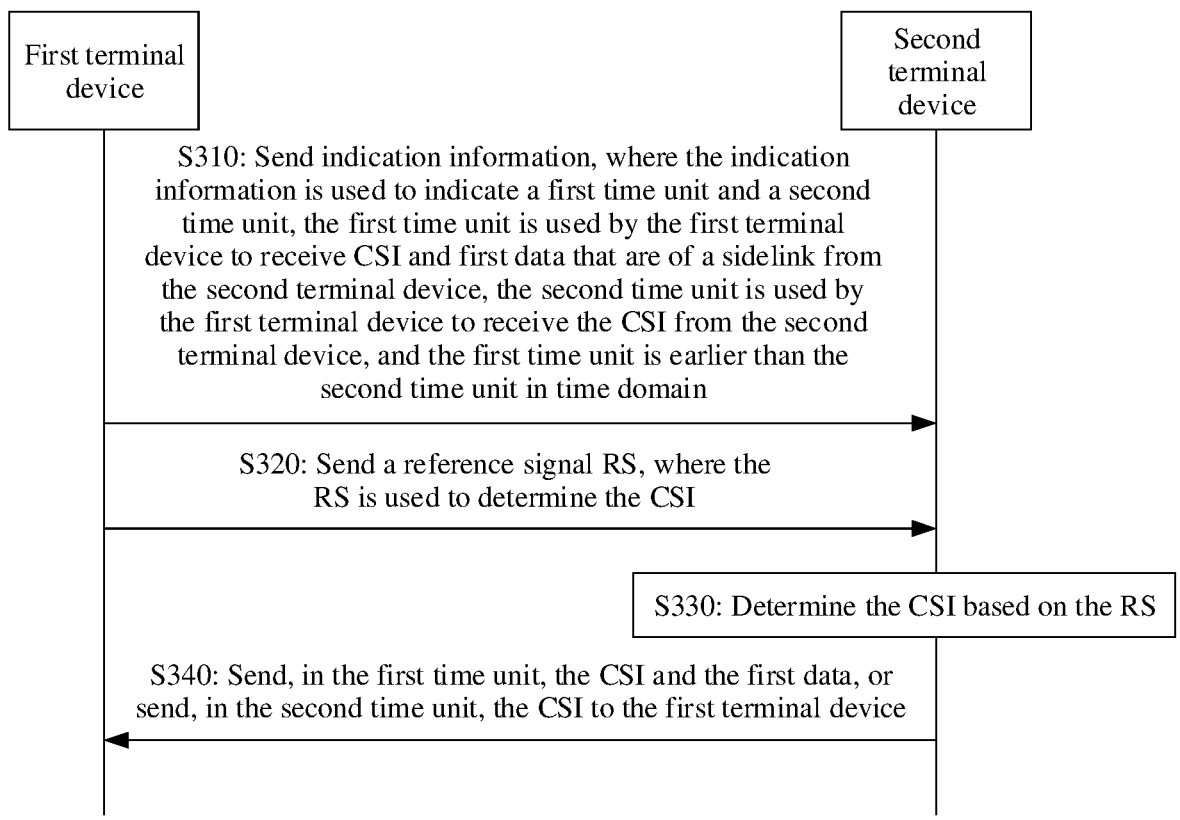
FIG. 10 is a schematic interaction diagram of another sidelink channel state information transmission method according to an embodiment of this application.

FIG. 10 is a schematic interaction diagram of a sidelink channel state information transmission method 300 according to this application. The method 300 may be applied to the scenarios shown in FIG. 1, FIG. 2, and FIG. 3; and certainly, may also be applied to another communication scenario. This is not limited in this embodiment of this application.

As shown in FIG. 10, the method 300 shown in FIG. 10 may include S310 to S340. The following describes in detail the steps in the method 300 with reference to FIG. 10.

S310: A first terminal device sends indication information to a second terminal device, where the indication information indicates a first time unit and a second time unit. The first time unit is used by the first terminal device to receive channel state information CSI and first data that are of a sidelink from the second terminal device, the second time unit is used by the first terminal device to receive the CSI from the second terminal device, the first time unit is earlier than the second time unit in time domain, and the first data is data sent by the second terminal device to the first terminal device. Correspondingly, the second terminal device receives the indication information.

S320: The first terminal device sends a reference signal RS to the second terminal device. Correspondingly, the second terminal device receives the RS.

S330: The second terminal device determines the CSI based on the RS.

S340: The second terminal device sends, in the first time unit, the CSI and the first data to the first terminal device, or sends, in the second time unit, the CSI to the first terminal device. Correspondingly, the first terminal device receives, in the first time unit, the CSI from the second terminal device, or receives, in the second time unit, the CSI from the second terminal device.

In S310, when the first terminal device needs to learn of the CSI of the sidelink between the first terminal device and the second terminal device, the first terminal device sends the indication information (or may be referred to as configuration information) to the second terminal device, to configure the first time unit and the second time unit for the second terminal device. The first time unit and the second time unit may be understood as two time periods. In this application, a time length of the first time unit and/or a time length of the second time unit may be one or more subframes, one or more slots, or one or more symbols. The length of the first time unit may be different from the length of the second time unit. For example, the time length of the first time unit may be greater than the time length of the second time unit. The first time unit is used by the first terminal device to receive the channel state information CSI and the first data that are of the sidelink from the second terminal device, that is, the first time unit is a time unit in which the second terminal device sends the CSI and the data to the first terminal device. The second time unit is used by the first terminal device to receive the CSI from the second terminal device, that is, the second time unit is a time unit in which the second terminal device sends only the CSI to the first terminal device. A PSSCH resource in the second time unit is used to carry only the CSI. A PSSCH resource in the first time unit is used to carry the data (the first data) and the CSI that are sent by the second terminal device to the first terminal device. In addition, the first time unit is earlier than the second time unit in time domain. There may be no time gap (time interval) between the first time unit and the second time unit. For example, it is assumed that the first time unit is a slot 0 to a slot 9, and the second time unit may be a slot 10. In this case, a valid time period for CSI measurement and feedback may be the slot 0 to the slot 10. Certainly, there may be a time gap between the first time unit and the second time unit. A sum of the time length of the first time unit and the time length of the second time unit (a valid time window) may be considered as the valid time period for the CSI measurement and feedback. It should be understood that the first terminal device may obtain information about the first time unit and the second time unit from a network device, and notify the information to the second terminal device. Alternatively, the first terminal device may independently determine the first time unit and the second time unit, and notify the first time unit and the second time unit to the second terminal device.

For example, the indication information may be SCI sent by the first terminal device to the second terminal device. The SCI may be carried on a PSCCH sent by the first terminal device to the second terminal device.

In S320, the first terminal device sends the RS to the second terminal device, where the RS is used to determine the CSI of the sidelink between the first terminal device and the second terminal device. For example, the RS may be carried on a PSSCH sent by the first terminal device to the second terminal device. The RS may include a cell-specific reference signal, a channel state information reference signal (CSI-RS), a demodulation reference signal (DMRS), and the like. Correspondingly, the second terminal device receives the RS.

In S330, the second terminal device determines the CSI of the sidelink based on the RS. That is, the CSI of the sidelink between the first terminal device and the second terminal device is determined.

In S340, the second terminal device sends, in the first time unit, the CSI and the first data to the first terminal device, or sends, in the second time unit, the CSI to the first terminal device. In other words, if the second terminal device has, in the first time unit, the first data that is to be sent to the first terminal device, both the CSI and the first data are carried on a PSSCH and sent to the first terminal device. If the second terminal device does not have, in the first time unit, the first data that is to be sent to the first terminal device, the second terminal device sends, in the second time unit, only the CSI to the first terminal device by including the CSI in a PSSCH.

According to the sidelink channel state information transmission method provided in this application, the first time unit and the second time unit are configured, where both the CSI and the data are transmitted in the first time unit, and only the CSI is transmitted in the second time unit. Even if there is no data transmission, normal transmission of the CSI is ensured, and therefore the CSI feedback is ensured. In addition, it is specified that sending only the CSI by using the PSSCH is performed exclusively in the second time unit, so that resource consumption caused by sending only the CSI by using the PSSCH is reduced, and resource utilization is improved.

It should be understood that in this embodiment of this application, moving speeds of the first terminal device and the second terminal device may cause different channel quality changes of the sidelink, and the channel quality changes cause different valid time periods of a CSI measurement report. Therefore, the time length of the first time unit and the time length of the second time unit may be determined based on the moving speeds of the first terminal device and the second terminal device.

It should be further understood that in this embodiment of this application, the time length of the first time unit and the time length of the second time unit may be each represented by using an absolute time length (for example, a microsecond (μs) or a millisecond (ms)). Alternatively, a quantity of time domain resources such as symbols, subframes, or slots may be used for representation. This is not limited herein in this application.

It should be further understood that in this embodiment of this application, the first time unit and/or the second time unit may be selected from a preconfigured time set. For example, the preconfigured time set is {T1, T2, T3, T4}, where T1, T2, T3, and T4 may be values obtained through simulation. In this case, for the first time unit or the second time unit, the first time unit or the second time unit may be indicated by using two bits in the indication information.

In this embodiment of this application, a timing start time point (moment) of the first time unit may be a time point (moment) at which the first terminal device triggers the second terminal device to report the CSI. For example, the first terminal device may send CSI trigger information (signaling) to the second terminal device, to trigger the second terminal device to report the CSI. In this case, the timing start time point of the first time unit may be a time point at which the second terminal device receives the trigger information. For another example, the timing start time point of the first time unit may be a time point at which the second terminal device receives the RS or a time point at which the first terminal device sends the RS. The timing start time point (moment) of the first time unit is not limited in this embodiment of this application.

Optionally, in some embodiments of this application, when the first data sent by the second terminal device to the first terminal device in the first time unit is unicast data, the second terminal device may send, to the first terminal device, the CSI together with the unicast data when sending the unicast data. If the second terminal device has, in the first time unit, no unicast data but only multicast or broadcast data, the second terminal device sends, in the first time unit, the CSI, an identifier of the first terminal device, and the broadcast data or the multicast data to the first terminal device.

Optionally, in some embodiments of this application, the CSI includes a channel quality indicator CQI value corresponding to the sidelink, or the CSI includes a CQI table corresponding to the sidelink and a CQI value in the CQI table.

Optionally, in some embodiments of this application, the first terminal device may further send, to the second terminal device, CQI table indication information corresponding to the sidelink, where the CQI table indication information indicates the CQI table corresponding to the sidelink, and the CQI table indication information includes a priority and/or a quality of service corresponding to data sent by the first terminal device to the second terminal device.

Optionally, in some embodiments of this application, the first terminal device may send first sidelink control information SCI to the second terminal device, where the first SCI is used to schedule the data sent by the first terminal device to the second terminal device on the sidelink, the first SCI includes a priority field and/or a quality of service indication field, and the priority field and/or the quality of service indication field are/indicates the CQI table.

Optionally, in some embodiments of this application, the first terminal device may further send the first sidelink control information SCI to the second terminal device, where the first SCI includes an indication field, the indication field indicates a modulation and coding scheme MCS table corresponding to the data sent by the first terminal device to the second terminal device on the sidelink, and the first SCI is used to schedule the data sent by the first terminal device to the second terminal device on the sidelink.

Optionally, in some embodiments of this application, the indication field in the first SCI is the priority field and/or the quality of service indication field in the first SCI, and the priority field or the quality of service indication field indicates the priority and/or the quality of service corresponding to the data.

Optionally, in some embodiments of this application, the CSI is carried in second SCI that is received by the first terminal device from the second terminal device.

It should be understood that for a specific process of the method 300 and the implementations of the method 300, refer to the foregoing related descriptions of the method 200. For brevity, details are not described herein again.

Figure 11:
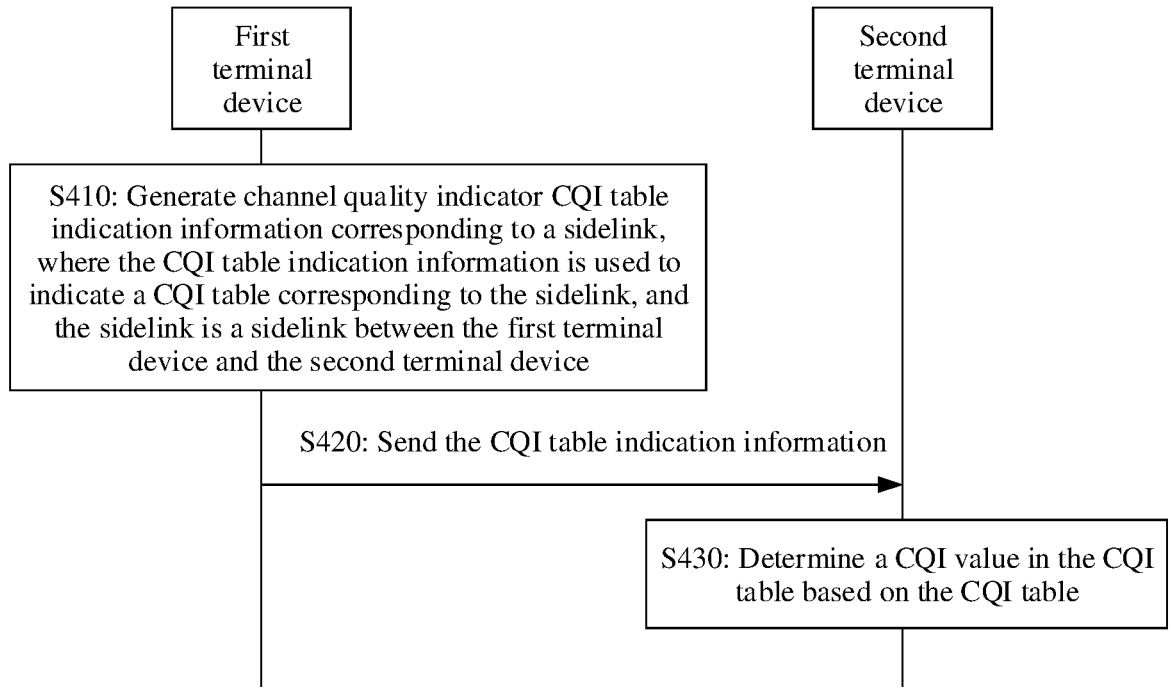
FIG. 11 is a schematic interaction diagram of a sidelink channel quality indicator determining method according to an embodiment of this application.

FIG. 11 is a schematic interaction diagram of a sidelink channel quality indicator determining method 400 according to this application. The method 400 may be applied to the scenarios shown in FIG. 1, FIG. 2, and FIG. 3; and certainly, may also be applied to another communication scenario. This is not limited in this embodiment of this application.

As shown in FIG. 11, the method 400 shown in FIG. 11 may include S410 to S430. The following describes in detail the steps in the method 400 with reference to FIG. 11.

S410: A first terminal device generates CQI table indication information corresponding to a sidelink, where the CQI table indication information indicates a CQI table corresponding to the sidelink, and the sidelink is a sidelink between the first terminal device and a second terminal device.

S420: The first terminal device sends the CQI table indication information to the second terminal device. Correspondingly, the second terminal device receives the CQI table indication information.

S430: The second terminal device determines a CQI value in the CQI table based on the CQI table.

According to the sidelink channel quality indicator determining method provided in this application, the first terminal device indicates the CQI table to the second terminal device. In a V2X communication system, even if the first terminal device and the second terminal device are not in coverage of a network device, the first terminal device sends the CQI table indication information to the second terminal device, so that the second terminal device can still accurately determine the CQI table and further determine the CQI value in the CQI table. This improves efficiency and reliability of determining the CQI table by the second terminal device.

Optionally, in a specific implementation, the CQI table indication information includes a priority and/or a quality of service corresponding to data sent by the first terminal device to the second terminal device.

Optionally, in a specific implementation, that the first terminal device sends the CQI table indication information to the second terminal device includes: The first terminal device sends first sidelink control information SCI to the second terminal device, where the first SCI is used to schedule the data sent by the first terminal device to the second terminal device on the sidelink, the first SCI includes a priority field and/or a quality of service indication field, and the priority field or the quality of service indication field indicates the priority and/or the quality of service corresponding to the data.

Optionally, in a specific implementation, the method 400 further includes: The second terminal device sends the CQI value to the first terminal device. For example, the CQI value may be included in CSI sent by the second terminal device to the first terminal device.

It should be understood that for a specific process of the method 400 and the implementations of the method 400, refer to the foregoing related descriptions of the method 200. For brevity, details are not described herein again.

Figure 12:
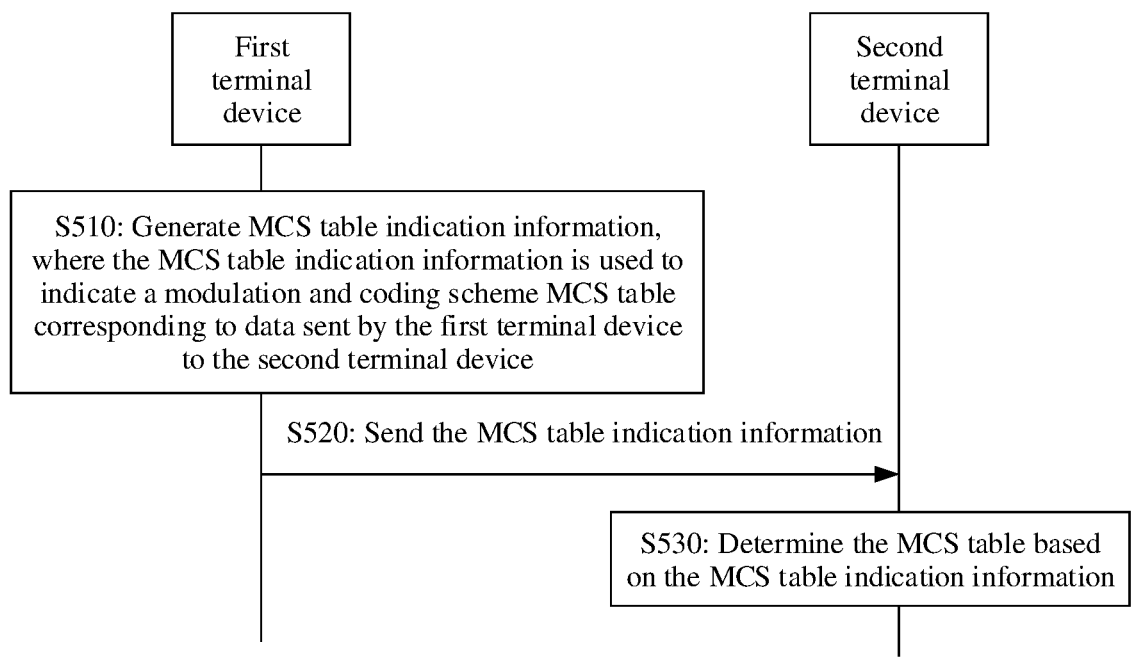
FIG. 12 is a schematic interaction diagram of a sidelink modulation and coding scheme determining method according to an embodiment of this application.

FIG. 12 is a schematic interaction diagram of a sidelink modulation and coding scheme information determining method 500 according to this application. The method 500 may be applied to the scenarios shown in FIG. 1, FIG. 2, and FIG. 3; and certainly, may also be applied to another communication scenario. This is not limited in this embodiment of this application.

As shown in FIG. 12, the method 500 shown in FIG. 12 may include S510 to S53o. The following describes in detail the steps in the method 500 with reference to FIG. 12.

S510: A first terminal device generates MCS table indication information, where the MCS table indication information indicates a modulation and coding scheme MCS table corresponding to data sent by the first terminal device to a second terminal device.

S520: The first terminal device sends the MCS table indication information to the second terminal device. Correspondingly, the second terminal device receives the MCS table indication information.

S530: The second terminal device determines the MCS table based on the MCS table indication information.

According to the sidelink modulation and coding scheme information determining method provided in this application, in a V2X communication system, even if the first terminal device and the second terminal device are not in coverage of a network device, the first terminal device sends the MCS table indication information to the second terminal device, so that the second terminal device can still accurately determine the MCS table and further determine an MCS parameter in the MCS table. This improves efficiency and reliability of determining the MCS table by the second terminal device. Therefore, the second terminal device correctly receives, based on the MCS parameter, the data sent by the first terminal device, thereby improving reliability of data transmission between the first terminal device and the second terminal device.

Optionally, in a specific implementation, the MCS table indication information includes an indication field in first sidelink control information SCI, the indication field in the first SCI indicates the MCS table, and the first SCI is used to schedule the data sent by the first terminal device to the second terminal device.

Optionally, in a specific implementation, the indication field in the first SCI includes a priority field and/or a quality of service indication field in the first SCI, and the priority field or the quality of service indication field indicates a priority and/or a quality of service corresponding to the data.

Optionally, in a specific implementation, the MCS table indication information includes MAC information, a SIB, a MIB, or broadcast channel information; the MAC information, the SIB, the MIB, or the broadcast channel information includes a second indication field; and the second indication field indicates the MCS table.

Optionally, in a specific implementation, the MCS table indication information includes a service type corresponding to the data, or a cyclic redundancy check CRC mask type or scrambling type corresponding to the data; and the service type corresponding to the data, or the CRC mask type or scrambling type corresponding to the data indicates the MCS table.

Optionally, in a specific implementation, the MCS table indication information includes a cyclic redundancy check CRC mask type of the first sidelink control information SCI, and the first SCI is used to schedule the data sent by the first terminal device to the second terminal device.

Optionally, in a specific implementation, the MCS table indication information includes an identifier of a resource pool for sending the data, and there is a correspondence between the resource pool and the MCS table.

Optionally, in a specific implementation, the MCS table indication information includes a format of the first sidelink control information SCI, and the first SCI is used to schedule the data sent by the first terminal device to the second terminal device on a sidelink.

It should be understood that for a specific process of the method 500 and the implementations of the method 500, refer to the foregoing related descriptions of the method 200. For brevity, details are not described herein again.

It should be understood that division of manners, cases, types, and embodiments in the embodiments of this application is merely for ease of description, but should not constitute any special limitation, and features in various manners, types, cases, and embodiments may be combined when there is no contradiction.

It should be further understood that numerals used in the embodiments of this application are differentiated merely for ease of description, but are not used to limit the scope of the embodiments of this application. Sequence numbers of the foregoing processes do not indicate an execution sequence. The execution sequence of the processes should be determined based on functions and internal logic of the processes, and should not be construed as any limitation on the implementation processes of the embodiments of this application.

It should be further understood that the foregoing descriptions are merely intended to help a person skilled in the art better understand the embodiments of this application, but are not intended to limit the scope of the embodiments of this application. It is clear that a person skilled in the art may make various equivalent modifications or changes based on the foregoing examples. For example, some steps in the method 200 to the method 500 may be unnecessary, some steps may be newly added, or any two or more of the foregoing embodiments may be combined. Such a modified, changed, or combined solution also falls within the scope of the embodiments of this application.

It should be further understood that, the foregoing descriptions of the embodiments of this application focus on a difference between the embodiments. For same or similar parts that are not mentioned, refer to each other. For brevity, details are not described herein again.

It should be further understood that in the embodiments of this application, "predefinition" may be implemented by pre-storing corresponding code or a corresponding table in a device (for example, a terminal device or a network device) or in another manner that can be used to indicate related information. A specific implementation of "predefinition" is not limited in this application.

The foregoing describes in detail the information transmission method according to the embodiments of this application with reference to FIG. 1 to FIG. 12. The following describes in detail communication apparatuses in the embodiments of this application with reference to FIG. 13 to FIG. 17.

Figure 13:
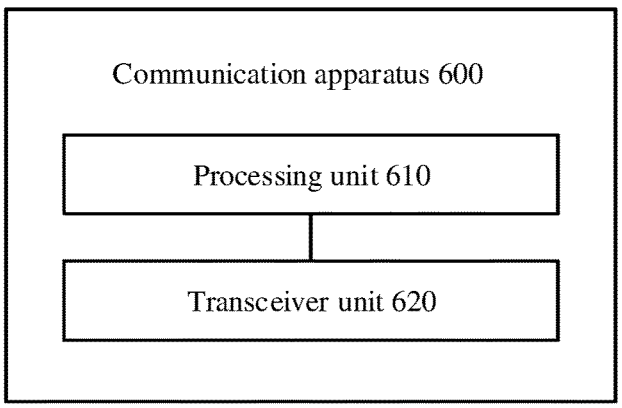
FIG. 13 is a schematic block diagram of a communication apparatus according to an embodiment of this application.

FIG. 13 is a schematic block diagram of a communication apparatus 600 according to an embodiment of this application. The apparatus 600 may correspond to the first terminal device described in the method 200 to the method 500, or may be a chip or a component used in the first terminal device. In addition, modules or units in the apparatus 600 are separately configured to perform the actions or processing processes performed by the first terminal device in the method 200 to the method 500.

As shown in FIG. 13, the apparatus 600 may include a processing unit 610 and a transceiver unit 620. The transceiver unit 620 is configured to be driven by the processing unit 610 to send or receive a specific signal.

The processing unit 610 is configured to generate indication information, where the indication information indicates a time window, a first time interval in the time window is used by the first terminal device to receive channel state information CSI and first data that are of a sidelink from a second terminal device, a second time interval in the time window is used by the first terminal device to receive the CSI from the second terminal device, and the first time interval is earlier than the second time interval in time domain.

The transceiver unit 620 is configured to send the indication information to the second terminal device.

The transceiver unit 620 is further configured to send a reference signal RS to the second terminal device, where the RS is used to determine the CSI.

The transceiver unit 620 is further configured to: receive, in the first time interval, the CSI and the first data from the second terminal device, or receive, in the second time interval, the CSI from the second terminal device.

According to the communication apparatus provided in this application, the time window for CSI feedback is configured, and the time window includes the first time interval used to feed back both the data and the CSI and the second time interval used to feed back only the CSI. Even if there is no data transmission, normal transmission of the CSI is ensured, and therefore the CSI feedback is ensured. In addition, it is specified that receiving or detecting only the CSI is performed exclusively in the second time interval, so that resource consumption caused by receiving or detecting only the CSI is reduced, and resource utilization is improved.

Optionally, in some embodiments of this application, the indication information further indicates a time domain position of the first time interval in the time window and/or a time domain position of the second time interval in the time window.

Optionally, in some embodiments of this application, the time domain position of the first time interval in the time window and/or the time domain position of the second time interval in the time window are/is predefined.

Optionally, in some embodiments of this application, the first data is broadcast data or multicast data, and the transceiver unit 620 is further configured to receive, in the first time interval, the CSI, an identifier of the first terminal device, and the broadcast data or the multicast data from the second terminal device.

Optionally, in some embodiments of this application, the CSI includes a channel quality indicator CQI value corresponding to the sidelink, or the CSI includes a CQI table corresponding to the sidelink and a CQI value in the CQI table.

Optionally, in some embodiments of this application, the transceiver unit 620 is further configured to send, to the second terminal device, CQI table indication information corresponding to the sidelink, where the CQI table indication information indicates the CQI table corresponding to the sidelink, and the CQI table indication information includes a priority and/or a quality of service corresponding to data sent by the first terminal device to the second terminal device.

Optionally, in some embodiments of this application, the transceiver unit 620 is further configured to send first sidelink control information SCI to the second terminal device, where the first SCI is used to schedule the data sent by the first terminal device to the second terminal device on the sidelink, the first SCI includes a priority field and/or a quality of service indication field, and the priority field and/or the quality of service indication field are/indicates the CQI table.

Optionally, in some embodiments of this application, the transceiver unit 620 is further configured to send the first sidelink control information SCI to the second terminal device, where the first SCI includes an indication field, the indication field indicates a modulation and coding scheme MCS table corresponding to the data sent by the first terminal device to the second terminal device on the sidelink, and the first SCI is used to schedule the data sent by the first terminal device to the second terminal device on the sidelink.

Optionally, in some embodiments of this application, the indication field in the first SCI is the priority field and/or the quality of service indication field in the first SCI, and the priority field or the quality of service indication field indicates the priority and/or the quality of service corresponding to the data.

Optionally, in some embodiments of this application, the CSI is carried in second SCI that is received by the first terminal device from the second terminal device.

Further, the apparatus 600 may further include a storage unit, and the transceiver unit 620 may be a transceiver, an input/output interface, or an interface circuit. The storage unit is configured to store instructions executed by the transceiver unit 620 and the processing unit 610. The transceiver unit 620, the processing unit 610, and the storage unit are coupled to each other. The storage unit stores the instructions. The processing unit 610 is configured to execute the instructions stored in the storage unit. The transceiver unit 620 is configured to send or receive a specific signal under driving of the processing unit 610.

It should be understood that for a specific process in which the units in the apparatus 600 perform the foregoing corresponding steps, refer to the foregoing descriptions related to the first terminal device with reference to the method 200 to the method 500 and the related embodiments in FIG. 4 and FIG. 7 to FIG. 12. For brevity, details are not described herein again.

Optionally, the transceiver unit 620 may include a receiving unit (module) and a sending unit (module), which are configured to perform the steps of receiving and sending information by the first terminal device in the embodiments of the method 200 to the method 500 and the embodiments shown in FIG. 4 and FIG. 7 to FIG. 12.

Figure 14:
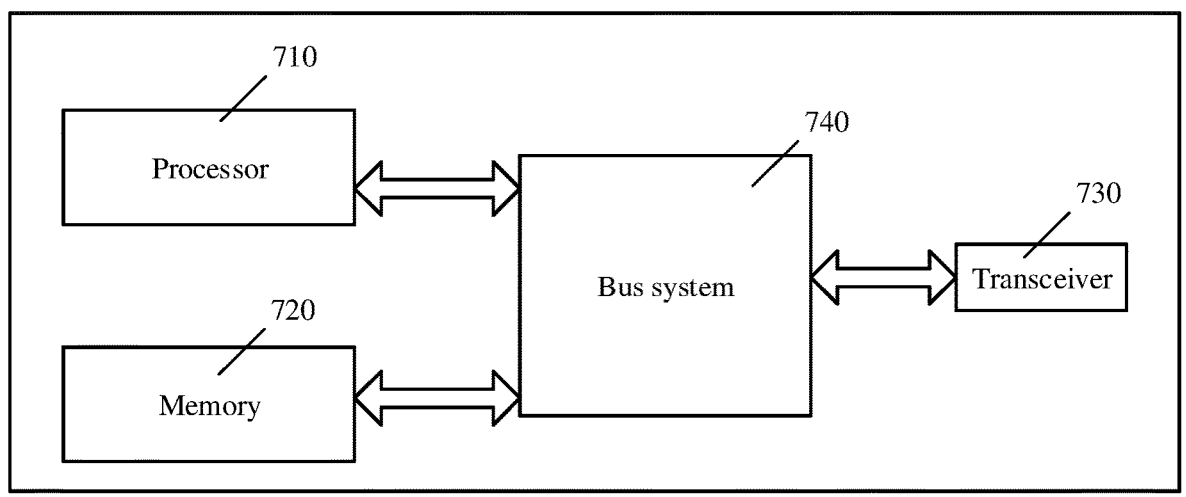
FIG. 14 is a schematic block diagram of a communication apparatus according to another embodiment of this application.

It should be understood that the transceiver unit 620 may be a transceiver, an input/output interface, or an interface circuit. The storage unit may be a memory. The processing unit 610 may be implemented by a processor. As shown in FIG. 14, a communication apparatus 700 may include a processor 710, a memory 720, a transceiver 730, and a bus system 740. Components of the communication apparatus 700 are coupled together through the bus system 740. In addition to a data bus, the bus system 740 may further include a power bus, a control bus, a status signal bus, and the like. However, for clear description, various types of buses in FIG. 14 are marked as the bus system 740. For ease of illustration, FIG. 14 merely shows an example of the bus system 740.

The communication apparatus 600 shown in FIG. 13 or the communication apparatus 700 shown in FIG. 14 can implement the steps performed by the first terminal device in the embodiments of the method 200 to the method 500 and the embodiments shown in FIG. 4 and FIG. 7 to FIG. 12. For similar descriptions, refer to the descriptions in the foregoing corresponding method. To avoid repetition, details are not described herein again.

It should be further understood that the communication apparatus 600 shown in FIG. 13 or the communication apparatus 700 shown in FIG. 14 may be a terminal device.

Figure 15:
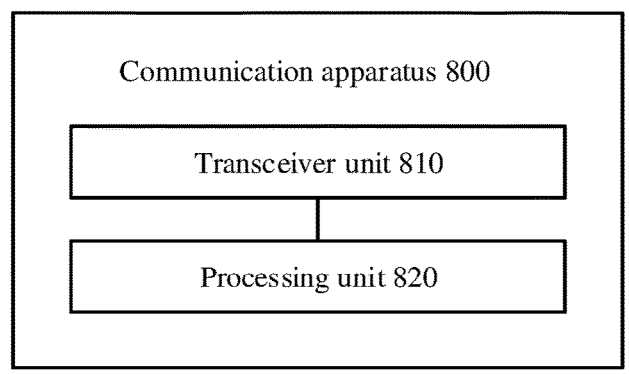
FIG. 15 is a schematic block diagram of a communication apparatus according to an embodiment of this application.

FIG. 15 is a schematic block diagram of a communication apparatus 800 according to an embodiment of this application. The apparatus 800 may correspond to the second terminal device described in the method 200 to the method 500, or may be a chip or a component used in the second terminal device. In addition, modules or units in the apparatus 800 are separately configured to perform the actions or processing processes performed by the second terminal device in the method 200 to the method 500.

As shown in FIG. 15, the apparatus 800 may include a transceiver unit 810 and a processing unit 820. The transceiver unit 720 is configured to be driven by the processing unit 810 to send or receive a specific signal.

The transceiver unit 810 is configured to receive indication information from a first terminal device, where the indication information indicates a time window.

The processing unit 820 is configured to determine a first time interval and a second time interval in the time window, where the first time interval is used by the second terminal device to send channel state information CSI and first data that are of a sidelink to the first terminal device, the second time interval is used by the second terminal device to send the CSI to the first terminal device, and the first time interval is earlier than the second time interval in time domain.

The transceiver unit 810 is further configured to receive a reference signal RS from the first terminal device.

The processing unit 820 is further configured to determine the CSI based on the RS.

The transceiver unit 810 is further configured to: send, in the first time interval, the CSI and the first data to the first terminal device, or send, in the second time interval, the CSI to the first terminal device.

According to the communication apparatus provided in this application, the time window for CSI feedback is configured, and the time window includes the first time interval used to feed back both the data and the CSI and the second time interval used to feed back only the CSI. Even if there is no data transmission, normal transmission of the CSI is ensured, and therefore the CSI feedback is ensured. In addition, it is specified that sending only the CSI is performed exclusively in the second time interval, so that resource consumption caused by sending only the CSI is reduced, and resource utilization is improved.

Optionally, in some embodiments of this application, the indication information further indicates a time domain position of the first time interval in the time window and/or a time domain position of the second time interval in the time window.

Optionally, in some embodiments of this application, the time domain position of the first time interval in the time window and/or the time domain position of the second time interval in the time window are/is predefined.

Optionally, in some embodiments of this application, the first data is broadcast data or multicast data, and the transceiver unit 810 is further configured to send, in the first time interval, the CSI, an identifier of the first terminal device, and the broadcast data or the multicast data to the first terminal device.

Optionally, in some embodiments of this application, the CSI includes a channel quality indicator CQI value corresponding to the sidelink, or the CSI includes a CQI table corresponding to the sidelink and a CQI value in the CQI table.

Optionally, in some embodiments of this application, the transceiver unit 810 is further configured to receive, from the first terminal device, CQI table indication information corresponding to the sidelink, where the CQI table indication information indicates the CQI table corresponding to the sidelink, and the CQI table indication information includes a priority and/or a quality of service corresponding to data received by the second terminal device from the first terminal device on the sidelink; and the processing unit 820 is further configured to determine, based on the CQI table indication information, the CQI table corresponding to the sidelink.

Optionally, in some embodiments of this application, the transceiver unit 810 is further configured to receive first sidelink control information SCI from the first terminal device, where the first SCI is used to schedule the data received by the second terminal device from the first terminal device on the sidelink, the first SCI includes a priority field and/or a quality of service indication field, and the priority field or the quality of service indication field indicates the priority and/or the quality of service corresponding to the data.

Optionally, in some embodiments of this application, the transceiver unit 810 is further configured to receive the first sidelink control information SCI from the first terminal device, where the first SCI includes an indication field, the indication field in the first SCI indicates a modulation and coding scheme MCS table corresponding to the data received by the second terminal device from the first terminal device on the sidelink, and the first SCI is used to schedule the data received by the second terminal device from the first terminal device on the sidelink.

Optionally, in some embodiments of this application, the indication field in the first SCI is the priority field and/or the quality of service indication field in the first SCI, and the priority field or the quality of service indication field indicates the priority and/or the quality of service corresponding to the data.

Optionally, in some embodiments of this application, the CSI is carried in second SCI that is sent by the second terminal device to the first terminal device.

Figure 16:
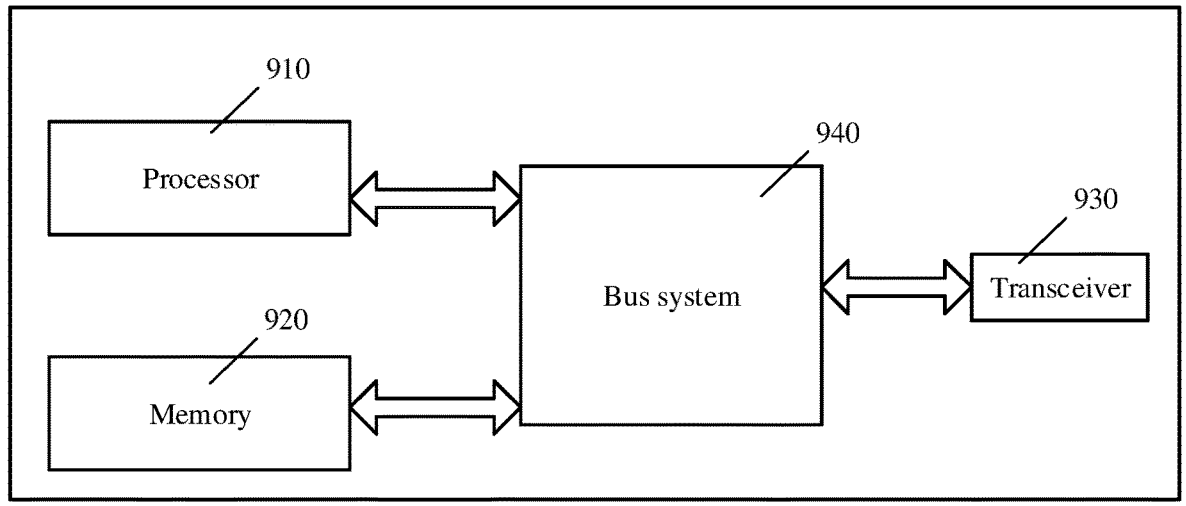
FIG. 16 is a schematic block diagram of a communication apparatus according to another embodiment of this application.

It should be understood that the transceiver unit 810 may be a transceiver, an input/output interface, or an interface circuit. The storage unit may be a memory. The processing unit 820 may be implemented by a processor. As shown in FIG. 16, a communication apparatus 900 may include a processor 910, a memory 920, a transceiver 930, and a bus system 940. Components of the communication apparatus 900 are coupled together through the bus system 940. In addition to a data bus, the bus system 940 may further include a power bus, a control bus, a status signal bus, and the like. However, for clear description, various types of buses in FIG. 16 are marked as the bus system 940. For ease of illustration, FIG. 16 merely shows an example of the bus system 940.

The communication apparatus 800 shown in FIG. 15 or the communication apparatus 900 shown in FIG. 16 can implement the steps performed by the second terminal device in the embodiments of the method 200 to the method 500 and the embodiments shown in FIG. 4 and FIG. 7 to FIG. 12. For similar descriptions, refer to the descriptions in the foregoing corresponding method. To avoid repetition, details are not described herein again.

It should be further understood that the communication apparatus 800 shown in FIG. 15 or the communication apparatus 900 shown in FIG. 16 may be a terminal device.

It should be further understood that division into the units in the apparatus is merely logical function division. During actual implementation, all or some of the units may be integrated into one physical entity, or may be physically separated. In addition, all the units in the apparatus may be implemented in a form of software invoked by a processing element, or may be implemented in a form of hardware; or some units may be implemented in a form of software invoked by a processing element, or may be implemented in a form of hardware. For example, each unit may be a separately disposed processing element, or may be integrated into a chip of the apparatus for implementation. Alternatively, each unit may be stored in a memory in a form of a program to be invoked by a processing element of the apparatus to perform a function of the unit. The processing element herein may also be referred to as a processor, and may be an integrated circuit having a signal processing capability. In an implementation process, the steps in the foregoing methods or the foregoing units may be implemented by using a hardware integrated logic circuit in the processing element, or may be implemented in a form of software invoked by the processing element.

For example, a unit in any one of the foregoing apparatuses may be one or more integrated circuits configured to implement the foregoing methods, for example, one or more application-specific integrated circuits (application specific integrated circuit, ASIC), one or more digital signal processors (DSP), one or more field programmable gate arrays (FPGA), or a combination of at least two of these integrated circuits. For another example, when the unit in the apparatus is implemented by scheduling a program by a processing element, the processing element may be a general purpose processor, for example, a central processing unit (CPU) or another processor that can invoke the program. For another example, the units may be integrated and implemented in a form of a system-on-a-chip (SOC).

Figure 17:
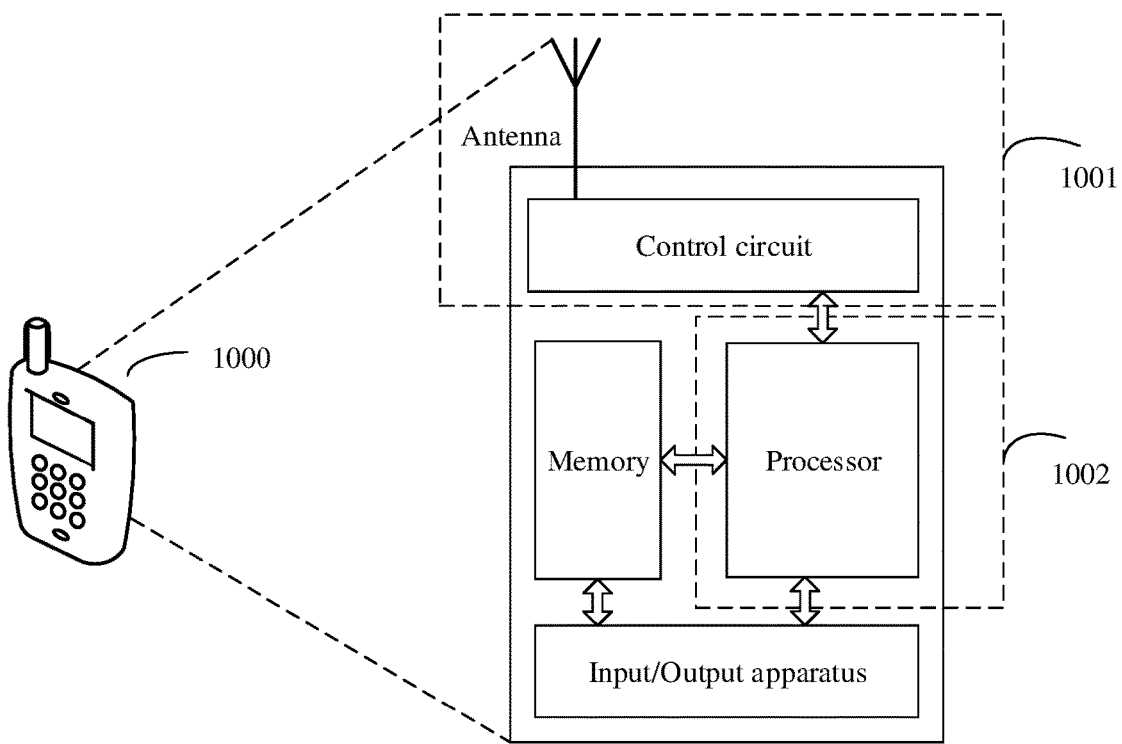
FIG. 17 is a schematic block diagram of a terminal device according to an embodiment of this application.

FIG. 17 is a schematic structural diagram of a terminal device 1000 according to this application. The apparatus 600, 700, 800, or 900 may be configured in the terminal device moo, or the apparatus 600, 700, 800, or 900 may be the terminal device 1000. In other words, the terminal device moo may perform the actions performed by the first terminal device or the second terminal device in the method 200 to the method 500.

For ease of description, FIG. 17 shows only main components of the terminal device. As shown in FIG. 17, the terminal device 1000 includes a processor, a memory, a control circuit, an antenna, and an input/output apparatus.

The processor is mainly configured to: process a communication protocol and communication data, control the entire terminal device, execute a software program, and process data of the software program, for example, is configured to support the terminal device in performing the actions described in the foregoing embodiments of the sidelink channel state information transmission method. The memory is mainly configured to store the software program and the data, for example, store the codebook described in the foregoing embodiments. The control circuit is mainly configured to: perform conversion between a baseband signal and a radio frequency signal, and process the radio frequency signal. A combination of the control circuit and the antenna may also be referred to as a transceiver that is mainly configured to send or receive a radio frequency signal in a form of an electromagnetic wave. The input/output apparatus, such as a touchscreen, a display, or a keyboard, is mainly configured to: receive data input by a user, and output data to the user.

After the terminal device is powered on, the processor may read the software program in the storage unit, explain and execute an instruction of the software program, and process data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside through the antenna in a form of an electromagnetic wave. When data is sent to the terminal device, the radio frequency circuit receives a radio frequency signal through the antenna, converts the radio frequency signal into a baseband signal, and outputs the baseband signal to the processor; and the processor converts the baseband signal into data, and processes the data.

A person skilled in the art may understand that for ease of description, FIG. 17 shows only one memory and one processor. An actual terminal device may have a plurality of processors and a plurality of memories. The memory may also be referred to as a storage medium, a storage device, or the like. This is not limited in the embodiments of this application.

For example, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 17 integrates functions of the baseband processor and the central processing unit. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected by using various buses. The baseband processor may also be referred to as a baseband processing circuit or a baseband processing chip. The central processing unit may also be referred to as a central processing circuit or a central processing chip. A function of processing the communication protocol and the communication data may be built in the processor, or may be stored in the storage unit in a form of a software program. The processor executes the software program to implement a baseband processing function.

For example, in this embodiment of this application, the antenna and the control circuit that have receiving and sending functions may be considered as a transceiver unit 1001 of the terminal device 1000, and the processor having a processing function may be considered as a processing unit 1002 of the terminal device 1000. As shown in FIG. 17, the terminal device moo includes the transceiver unit 1001 and the processing unit 1002. The transceiver unit may also be referred to as a transceiver, a transceiver machine, a transceiver apparatus, or the like. Optionally, a component that is in the transceiver unit 1001 and that is configured to implement a receiving function may be considered as a receiving unit, and a component that is in the transceiver unit 1001 and that is configured to implement a sending function may be considered as a sending unit. In other words, the transceiver unit 1001 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like.

It should be understood that, the processor in the embodiments of this application may be a central processing unit (CPU), or the processor may be another general purpose processor, a digital signal processor (DSP), an application-specific integrated circuit (application specific integrated circuit, ASIC), a field programmable gate array (FPGA) or another programmable logic device, a discrete gate or a transistor logic device, a discrete hardware component, or the like. The general purpose processor may be a microprocessor, or the processor may be any conventional processor, or the like.

It should be further understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative descriptions, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware, firmware, or any other combination thereof. When software is used to implement the embodiments, all or some of the foregoing embodiments may be implemented in a form of a computer program product. The computer program product includes one or more computer instructions or computer programs. When the computer instructions or the computer programs are loaded and executed on a computer, the procedures or functions according to the embodiments of this application are completely or partially generated. The computer may be a general purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable medium sets. The usable medium may be a magnetic medium (for example, a floppy disk, a hard disk, or a magnetic tape), an optical medium (for example, a DVD), or a semiconductor medium. The semiconductor medium may be a solid-state drive.

An embodiment of this application further provides a communication system, and the communication system includes the first terminal device and the second terminal device.

An embodiment of this application further provides a computer-readable medium, configured to store computer program code. The computer program includes instructions used to perform the methods provided in the method 200 to the method 500 in the embodiments of this application. The readable medium may be a read-only memory (ROM) or a random access memory (RAM). This is not limited in the embodiments of this application.

This application further provides a computer program product. The computer program product includes instructions. When the instructions are executed, a first terminal device and a second terminal device are enabled to respectively perform the operations corresponding to the first terminal device and the second terminal device in the foregoing methods.

An embodiment of this application further provides a system chip. The system chip includes a processing unit and a communication unit. The processing unit may be, for example, a processor, and the communication unit may be, for example, an input/output interface, a pin, or a circuit. The processing unit may execute computer instructions, so that a chip in a communication apparatus performs any method provided in the foregoing embodiments of this application.

Optionally, any communication apparatus provided in the foregoing embodiments of this application may include the system chip.

Optionally, the computer instructions are stored in a storage unit.

Optionally, the storage unit is a storage unit inside the chip, such as a register or a cache. Alternatively, the storage unit may be a storage unit that is inside a terminal and that is located outside the chip, such as a ROM, another type of static storage device that can store static information and instructions, or a RAM. The processor mentioned in any of the foregoing descriptions may be a CPU, a microprocessor, an ASIC, or one or more integrated circuits for controlling program execution of the feedback information transmission method. The processing unit and the storage unit may be decoupled, are separately disposed on different physical devices, and are connected in a wired or wireless manner to implement functions of the processing unit and the storage unit, to support the system chip in implementing various functions in the foregoing embodiments. Alternatively, the processing unit and the memory may be coupled to a same device.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative descriptions, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The terms "system" and "network" may be used interchangeably in this specification. The term "and/or" in this specification describes only an association relationship for describing associated objects and represents that there may be three relationships. For example, A and/or B may represent the following three cases: Only A exists, both A and B exist, and only B exists. In addition, the character "/" in this specification usually indicates an "or" relationship between the associated objects.

The terms "uplink" and "downlink" in this application are used to describe a data/information transmission direction in a specific scenario. For example, an "uplink" direction is usually a direction in which data/information is transmitted from a terminal to a network side, or a direction in which data/information is transmitted from a distributed unit to a centralized unit, and a "downlink" direction is usually a direction in which data/information is transmitted from a network side to a terminal, or a direction in which data/information is transmitted from a centralized unit to a distributed unit. It may be understood that the "uplink" and the "downlink" are only used to describe transmission directions of data/information, and neither a specific start device nor a specific end device of data/information transmission is limited.

Names may be assigned to various objects that may appear in this application, for example, various messages/information/devices/network elements/systems/apparatuses/actions/operations/procedures/concepts. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments. Details are not described herein again.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to a current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: a USB flash drive, a removable hard disk, a read-only memory (ROM), and a random access memory.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to a current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method for communications between a first terminal device and a second terminal device, comprising:
    generating modulation and coding scheme (MCS) table indication information, wherein the MCS table indication information indicates a MCS table for sending data from the first terminal device to the second terminal device; and
    sending the MCS table indication information to the second terminal device, wherein the MCS table indication information is sent using an indication field in first sidelink control information (SCI), the indication field in the first SCI indicates the MCS table, and the first SCI schedules the data to be sent from the first terminal device to the second terminal device, wherein the first SCI comprises one bit that indicates one of two MCS tables configured for vehicle-to-everything (V2X) communication, or the first SCI comprises two bits that indicate one of three MCS tables configured for V2X communication.

2. The method according to claim 1, wherein the MCS table indication information enables the second terminal device to determine a channel quality indicator (CQI) table corresponding to a sidelink between the second terminal device and the first terminal device.

3. The method according to claim 1, wherein the method further comprises:
    sending configuration information to the second terminal device, wherein the configuration information configures a time window for the second terminal device, the time window being a time period configured for channel state information (CSI) feedback.

4. The method according to claim 3, wherein a time length of the time window is one or more slots.

5. The method according to claim 3, wherein the time window is selected from a preconfigured time set.

6. A communication method for communications between a first terminal device and a second terminal device, comprising:
    receiving modulation and coding scheme (MCS) table indication information, wherein the MCS table indication information indicates a MCS table corresponding to data received from the first terminal device, wherein the MCS table indication information is carried in an indication field in first sidelink control information (SCI), the indication field in the first SCI indicates the MCS table, and the first SCI schedules the data received by the second terminal device from the first terminal device, wherein the first SCI comprises one bit that indicates one of two MCS tables configured for vehicle-to-everything (V2X) communication, or the first SCI comprises two bits that indicate one of three MCS tables configured for V2X communication; and
    determining the MCS table based on the MCS table indication information.

7. The method according to claim 6, wherein the method further comprises:
    determining, based on the MCS table indication information, a channel quality indicator (CQI) table corresponding to a sidelink between the second terminal device and the first terminal device.

8. The method according to claim 7, wherein the method further comprises:
    receiving configuration information from the first terminal device, wherein the configuration information configures a time window for the second terminal device, and the time window is a time period configured for channel state information CSI feedback.

9. The method according to claim 8, wherein a time length of the time window is one or more slots.

10. The method according to claim 8, wherein the time window is selected from a preconfigured time set.

11. A communication apparatus, comprising:
    one or more processors; and
    a non-transitory memory, wherein the memory stores a computer program, and when executing the computer program stored in the memory, the one or more processors execute operations comprising:
    generating modulation and coding scheme (MCS) table indication information, wherein the MCS table indication information indicates a MCS table for sending data by the communication apparatus to a second terminal device, wherein the MCS table indication information is sent using an indication field in first sidelink control information (SCI), the indication field in the first SCI indicates the MCS table, and the first SCI schedules the data sent by the communication apparatus to the second terminal device, wherein the first SCI comprises one bit that indicates one of two MCS tables configured for vehicle-to-everything (V2X) communication, or the first SCI comprises two bits that indicate one of three MCS tables configured for V2X communication; and
    sending the MCS table indication information to the second terminal device.

12. The communication apparatus according to claim 11, wherein the MCS table indication information enables the second terminal device to determine a channel quality indicator (CQI) table corresponding to a sidelink between the second terminal device and the communication apparatus.

13. The communication apparatus according to claim 11, wherein the operations further comprise:
sending configuration information to the second terminal device, wherein the configuration information configures a time window for the second terminal device, the time window being a time period configured for channel state information (CSI) feedback.

14. The communication apparatus according to claim 13, wherein a time length of the time window is one or more slots.

15. The communication apparatus according to claim 13 wherein the time window is selected from a preconfigured time set.

16. A communication apparatus, comprising:
one or more processors; and
a non-transitory memory, wherein the memory stores a computer program, and when executing the computer program stored in the memory, the one or more processors execute operations comprising:
receiving modulation and coding scheme (MCS) table indication information, wherein the MCS table indication information indicates a MCS table corresponding to data received by the communication apparatus from a first terminal device, wherein the MCS table indication information is carrier in an indication field in first sidelink control information (SCI), the indication field in the first SCI indicates the MCS table, and the first SCI schedules the data received by the communication apparatus from the first terminal device, wherein the first SCI comprises one bit that indicates one of two MCS tables configured for vehicle-to-everything (V2X) communication, or the first SCI comprises two bits that indicate one of three MCS tables configured for V2X communication; and
determining the MCS table based on the MCS table indication information.

17. The communication apparatus according to claim 16, wherein the operations further comprise:
determining, based on the MCS table indication information, a channel quality indicator (CQI) table corresponding to a sidelink between the communication apparatus and the first terminal device.

18. The communication apparatus according to claim 16, herein the operations further comprise:
receiving configuration information from the first terminal device, wherein the configuration information configures a time window for the communication apparatus, the time window being a time period configured for channel state information (CSI) feedback.

19. The communication apparatus according to claim 18, wherein a time length of the time window is one or more slots.

20. The communication apparatus according to claim 18, wherein the time window is selected from a preconfigured time set.

21. The method according to claim 1, wherein the SCI further comprises an MCS index, wherein the MCS index and the MCS table are used to determine a modulation order and a target code rate.

22. The method according to claim 6, wherein the SCI further comprises an MCS index, the method further comprises:
determining, using the MCS index and the determined MCS table, a modulation order and a target code rate.

23. The communication apparatus according to 11, wherein the SCI further comprises an MCS index, wherein the MCS index and the MCS table are used to determine a modulation order and a target code rate.

24. The communication apparatus according to 16, wherein the SCI further comprises an MCS index, the operations further comprise:
determining, using the MCS index and the determined MCS table, a modulation order and a target code rate.

\* \* \* \* \*